United States Patent
Schwartz et al.

(10) Patent No.: US 11,292,940 B2
(45) Date of Patent: Apr. 5, 2022

(54) POLYMERIC ADHESIVE LAYERS AS CERAMIC PRECURSORS

(71) Applicant: 3M INNOVATIVE PROPERTIES COMPANY, St. Paul, MN (US)

(72) Inventors: Evan L. Schwartz, Vadnais Heights, MN (US); Brett J. Sitter, Cottage Grove, MN (US); Shijing Cheng, Woodbury, MN (US); Justin P. Meyer, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 209 days.

(21) Appl. No.: 16/319,425

(22) PCT Filed: Jul. 18, 2017

(86) PCT No.: PCT/US2017/042568
§ 371 (c)(1),
(2) Date: Jan. 21, 2019

(87) PCT Pub. No.: WO2018/017560
PCT Pub. Date: Jan. 25, 2018

(65) Prior Publication Data
US 2019/0352542 A1 Nov. 21, 2019

Related U.S. Application Data

(60) Provisional application No. 62/365,459, filed on Jul. 22, 2016.

(51) Int. Cl.
*C09J 5/06* (2006.01)
*C09J 7/38* (2018.01)
(Continued)

(52) U.S. Cl.
CPC . *C09J 5/06* (2013.01); *C09J 7/10* (2018.01); *C09J 7/385* (2018.01); *C09J 7/40* (2018.01);
(Continued)

(58) Field of Classification Search
CPC ....... C09J 7/385; C09J 7/40; C09J 7/10; C09J 11/08; C09J 2301/302; C09J 2301/408;
(Continued)

(56) References Cited

U.S. PATENT DOCUMENTS

| 2,676,182 A | 4/1954 | Daudt |
| 2,736,721 A | 2/1956 | Dexter |

(Continued)

FOREIGN PATENT DOCUMENTS

| EP | 0224795 | 6/1987 |
| EP | 2048210 | 4/2009 |
| JP | 5091390 | 12/2012 |

OTHER PUBLICATIONS

Das Periodensystem online, [retrieved from the internet on Aug. 12, 2014] URL http://www.periodensystemonline.de/index.php?sel=wertdesc&prop=pKb-Werte&show=list&el=92&id=acid, pp. 12.
(Continued)

*Primary Examiner* — Scott R. Walshon
(74) *Attorney, Agent, or Firm* — Jeffrey M. Olofson

(57) ABSTRACT

Transfer tapes include a releasing substrate and an adhesive layer adjacent to the surface of the releasing substrate. The adhesive layer includes a cured copolymer prepared from a reaction mixture that includes at least one alkyl (meth) acrylate, at least one ethylenically unsaturated silane, and an initiator. The adhesive layer is a pressure sensitive adhesive at room temperature and is convertible into a ceramic-like layer by bake-out at a temperature of from 170-500°.

24 Claims, 9 Drawing Sheets

(51) Int. Cl.
- *C09J 11/08* (2006.01)
- *C09J 7/40* (2018.01)
- *C09J 7/10* (2018.01)

(52) U.S. Cl.
CPC .......... *C09J 11/08* (2013.01); *C09J 2203/326* (2013.01); *C09J 2301/302* (2020.08); *C09J 2301/408* (2020.08); *C09J 2301/414* (2020.08); *C09J 2433/00* (2013.01); *C09J 2483/00* (2013.01)

(58) Field of Classification Search
CPC ............ C09J 2301/414; C09J 2203/326; C09J 2433/00; C09J 2483/00; C09J 4/00; C09J 7/29; C09J 2301/312; C08L 83/04
See application file for complete search history.

(56) References Cited

U.S. PATENT DOCUMENTS

| | | | |
|---|---|---|---|
| 3,627,851 | A | 12/1971 | Brady |
| 3,772,247 | A | 11/1973 | Flannigan |
| 4,255,316 | A | 3/1981 | Blizzard |
| 4,269,757 | A | 5/1981 | Mine |
| 4,422,891 | A | 12/1983 | Gonser |
| 4,737,559 | A | 4/1988 | Kellen |
| 4,737,577 | A | 4/1988 | Brown |
| 4,935,484 | A | 6/1990 | Wolfgruber |
| 5,110,890 | A | 5/1992 | Butler |
| 5,248,739 | A | 9/1993 | Schmidt |
| 5,302,685 | A | 4/1994 | Tsumura |
| 5,319,040 | A | 6/1994 | Wengrovius |
| 5,453,104 | A | 9/1995 | Schwabel |
| 5,904,791 | A | 5/1999 | Bearinger |
| 6,369,123 | B1 | 4/2002 | Stark |
| 6,376,590 | B2 | 4/2002 | Kolb |
| 6,461,419 | B1 | 10/2002 | Wu |
| 6,467,897 | B1 | 10/2002 | Wu |
| 6,582,804 | B2 | 6/2003 | Wu |
| 6,719,422 | B2 | 4/2004 | Wu |
| 6,858,253 | B2 | 2/2005 | Williams |
| 7,241,437 | B2 | 7/2007 | Davidson |
| 7,294,298 | B2 | 11/2007 | Iijima |
| 2011/0126968 | A1* | 6/2011 | Determan ............... C09J 7/243 156/229 |
| 2014/0004331 | A1 | 1/2014 | Hida |
| 2014/0021492 | A1 | 1/2014 | Wolk |
| 2014/0135417 | A1 | 5/2014 | Sugino |
| 2014/0242343 | A1 | 8/2014 | Free |

OTHER PUBLICATIONS

Encyclopedia of Polymer Science and Engineering, vol. 15, John Wiley & Sons, New York, (1989), pp. 265-270.
Grassie, "The thermal degradation of polysiloxanes—I. Poly(dimethylsiloxane)", European Polymer Journal, 1978, vol. 14, No. 11, pp. 875-884.
Ro, "High-Modulus Spin-On Organosilicate Glasses for Nanoporous Applications", Adv. Mater., Mar. 2007, vol. 19, No. 5, pp. 705-710.
Shaw, "Negative photoresists for optical lithography," IBM Journal of Research and Development, IBM Journal of Research and Development,1997, vol. 41, No. 1.2, pp. 81-94.
Smith, "Modern Optical Engineering", McGraw-Hill, 1966, Chapter four, pp. 104-105.
International Search report for PCT International application No. PCT/US2017/042568 dated Oct. 20, 2017, 5 pages.

\* cited by examiner

POLYMERIC ADHESIVE LAYERS AS CERAMIC PRECURSORS

FIELD OF THE DISCLOSURE

This disclosure relates to polymeric adhesive layers, especially pressure sensitive adhesive layers that can be used as precursors for ceramic-like layers.

BACKGROUND

Adhesives have been used for a variety of marking, holding, protecting, sealing and masking purposes. Adhesive tapes generally comprise a backing, or substrate, and an adhesive. One specific type of tape, called a transfer tape, does not comprise a backing, but rather is a standalone adhesive layer. Among the types of adhesives used in tapes, are pressure sensitive adhesives and heat activated adhesives, with pressure sensitive adhesives being the more common.

Pressure sensitive adhesives are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are natural rubber, synthetic rubbers (e.g., styrene/butadiene copolymers (SBR) and styrene/isoprene/styrene (SIS) block copolymers), various (meth)acrylate (e.g., acrylate and methacrylate) copolymers and silicones. Each of these classes of materials has advantages and disadvantages.

Examples of vitrifiable adhesives include U.S. Pat. No. 4,422,891 (Gonser et al.), which describes adhering together of articles with a polymerizable adhesive comprising a particulate, inorganic filler, and a polymerizable resin comprising at least 0.25% by weight of a polymerizable silane. The adhesive is polymerized and then heated to form a vitrified bond.

U.S. Pat. No. 5,904,791 (Bearinger et al.) describes a method of adhering an electronic component to a substrate with a layer of a preceramic polymer applied between the electronic component and the substrate followed by heating to convert the preceramic polymer into a ceramic.

U.S. Pat. No. 7,294,298 (Iijima) describes a mixture of an acrylate adhesive with a silicone resin, which is used to bond transparent conductive nanoparticle layers to a substrate, followed by calcining.

US Patent Publication No. 2014/0004331 (Hida et al.) describes a shatterproofing member with a hardenable, pressure-sensitive adhesive that can form a bond between two surfaces at room temperature and also shows adhesive property after being sintered.

US Patent Publication No. 2014/0021492 (Wolk et al.) describes a lamination transfer film and process to impart nanostructure on a receptor surface.

SUMMARY

Disclosed herein are adhesive layers, transfer tapes that include the adhesive layers, multilayer articles that include or are prepared from the transfer tapes, and methods of preparing and using the adhesive layers, transfer tapes, and multilayer articles.

The disclosure includes adhesive layers. The adhesive layers comprise a cured copolymer prepared from a reaction mixture comprising at least one alkyl (meth)acrylate, at least one ethylenically unsaturated silane, and an initiator. The adhesive layer is a pressure sensitive adhesive at room temperature and is convertible into a ceramic-like layer by bake-out at a temperature of from 170-500° C.

Also disclosed are transfer tapes. The transfer tapes comprise a release substrate with a first major surface and a second major surface, and an adhesive layer adjacent to at least a portion of the second major surface of the release substrate. The adhesive layer has been described above and comprises a cured copolymer prepared from a reaction mixture comprising at least one alkyl (meth)acrylate, at least one copolymerizable ethylenically unsaturated compound that is free of acidic or basic groups, at least one ethylenically unsaturated silane, and an initiator. The adhesive layer is a pressure sensitive adhesive at room temperature and is convertible into a ceramic-like layer by bake-out at a temperature of from 170-500° C.

The disclosure also includes multilayer articles comprising a receptor substrate comprising a first major surface and a second major surface, and a ceramic-like layer in contact with the second major surface of the receptor substrate, the ceramic-like layer comprising a baked-out pressure sensitive adhesive layer, where the pressure sensitive adhesive is baked-out at a temperature of from 170-500° C. The pressure sensitive adhesive layer has been described above and comprises a cured copolymer prepared from a reaction mixture comprising at least one alkyl (meth)acrylate, at least one copolymerizable ethylenically unsaturated compound that is free of acidic or basic groups, at least one ethylenically unsaturated silane, and an initiator. In some embodiments, a cured backfill layer is present on the ceramic-like layer comprising a baked-out pressure sensitive adhesive layer.

Also disclosed are methods of preparing articles comprising providing a receptor substrate with a first major surface and a second major surface, providing a transfer tape comprising a releasing substrate and a pressure sensitive adhesive layer adjacent to the substrate, applying the transfer tape to the receptor substrate such that the pressure sensitive adhesive layer is in contact with the second major surface of the receptor substrate, removing the releasing substrate from the transfer tape in contact with the second major surface of the receptor substrate to form a pressure sensitive adhesive layer laminated to the second major surface of the receptor substrate, and baking-out the pressure sensitive adhesive layer laminated to the second major surface of the receptor substrate at a temperature from 170-500° C., to form a ceramic-like layer on the second major surface of the receptor substrate. In some embodiments, the transfer tape includes a backfill layer between the releasing substrate and the pressure sensitive adhesive layer, which upon bake-out, forms a cured backfill layer on the ceramic-like layer comprising a baked-out pressure sensitive adhesive layer.

BRIEF DESCRIPTION OF THE DRAWINGS

The present application may be more completely understood in consideration of the following detailed description of various embodiments of the disclosure in connection with the accompanying drawings.

DETAILED DESCRIPTION

Figure 1:
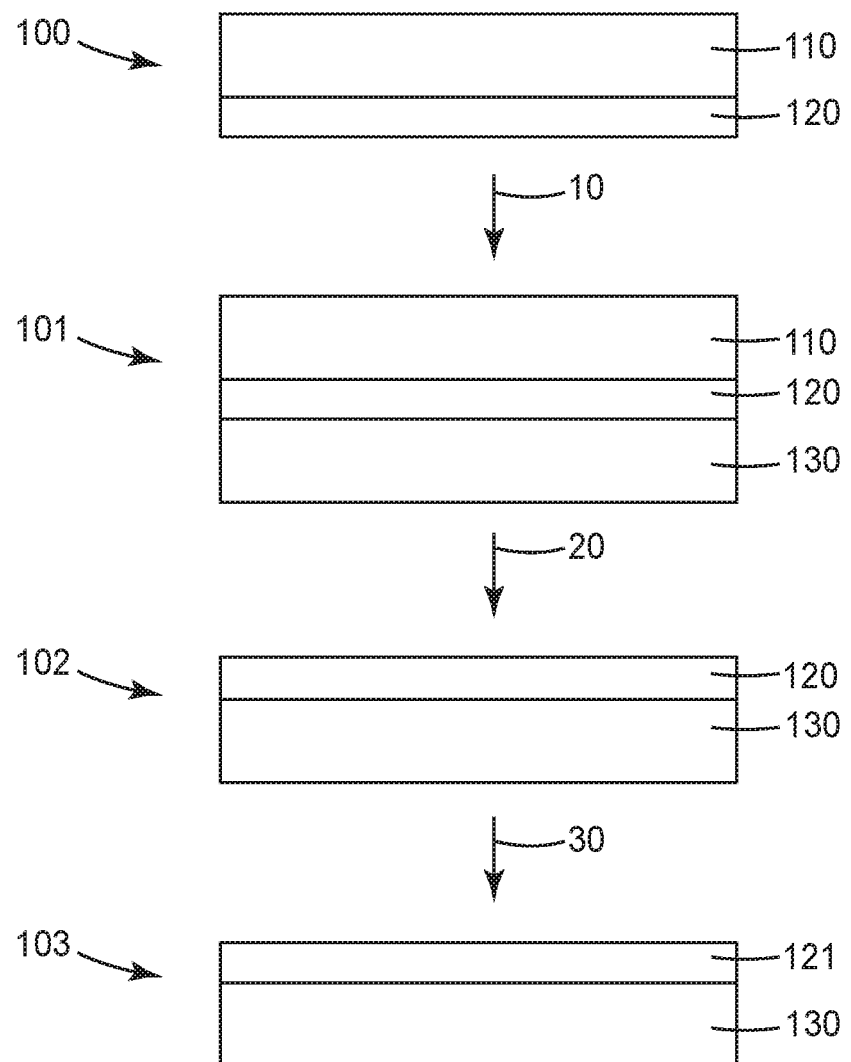
FIG. 1 is a cross sectional view of an embodiment of a process for preparing and using the adhesive layers, transfer tapes, and multilayer articles of the present disclosure.

The use of adhesives, especially pressure sensitive adhesives, in areas such as the medical, electronic, automotive, energy, and optical industries is increasing. The requirements of these industries place additional demands upon the pressure sensitive adhesive beyond the traditional properties of tack, peel adhesion and shear holding power. New classes of materials are desirable to meet the increasingly demanding performance requirements for pressure sensitive adhesives. Among the performance requirements for new classes of pressure sensitive adhesives are optical properties such as being optically transparent or optically clear.

Double-sided adhesives, also called "transfer tapes" or "transfer films" are adhesive layers that have adhesive on both exposed surfaces. In some transfer tapes, the exposed surfaces are simply the two surfaces of a single adhesive layer. Other transfer tapes are multi-layer transfer tapes with at least two adhesive layers that may be the same or different, and in some instances intervening layers that may not be adhesive layers. In this disclosure, transfer tapes are prepared that comprise a single layer of adhesive.

Typically, transfer tapes are used to adhere two different substrates, that is to say they are used to form three layer laminates that contain: a substrate/transfer tape/a different substrate. Laminates of this type are formed using a wide range of substrates, such as, for example, papers, sheets, films, plates, etc. The transfer tapes of the present disclosure, can be used to adhere two different substrates to each other, but also may be adhered to one substrate and have an exposed outer surface that is not adhered to a substrate. In this disclosure, the pressure sensitive adhesive layer is used not only as an adhesive layer but also as a precursor for a thin ceramic-like layer.

There are numerous advantages in using a layer of pressure sensitive adhesive as a precursor to a ceramic-like layer. Because the transfer film is a pressure sensitive adhesive it can be handled as a tape, typically as a layer of pressure sensitive adhesive disposed on a releasing substrate. The advantages of tape handling as opposed to a handling of a liquid medium are many, as the tape is easier to dispense, handle, adhere, and remove and reattach if necessary since the adhesive is in the form of a standalone film. Additionally, since the pressure sensitive adhesive layer is protected by a non-tacky releasing substrate, the adhesive is protected from sticking to itself, becoming contaminated, or adhering to the dispensing apparatus or person handling the adhesive film. Also films can be cut into an unlimited number of sizes and shapes in a predetermined way to match the surface to which it is to be adhered without the worry about the mess and difficulties associated with the precise dispensing of liquids.

There are special advantages to using pressure sensitive transfer tapes as precursors to ceramic-like layers. The adhesive film can be easily handled and precisely sized for the desired application, and because the film is an adhesive it self-adheres to the substrate. In this way the precursor is dispensed more easily and precisely than if a liquid precursor were applied. In applications that utilize high temperature processing steps, such as commonly used in semiconductor and display manufacturing, the adhesive can be converted to a ceramic-like layer capable of retaining covalent bonds to the substrates to which it is adhered. In this way, the adhesive is capable of strong adhesion in both high and low temperature operations.

This disclosure describes adhesive layers that comprise a cured copolymer prepared from a reaction mixture comprising at least one alkyl (meth)acrylate, at least one ethylenically unsaturated silane, and an initiator. In some embodiments the reaction mixture also includes at least one copolymerizable ethylenically unsaturated compound that is free of acidic or basic groups. The adhesive layer is a pressure sensitive adhesive at room temperature and is convertible into a ceramic-like layer by bake-out at a temperature of from 170-500°. Also disclosed herein are articles comprising these adhesive layers and methods for making and using the adhesive layers to prepare articles.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The terms "backfill materials" or "backfill layers" as used herein refer to layers of materials that fill in irregular or structured surfaces to produce a new surface that may be used as a base to build additional layered elements and is thermally stable.

The term "bake-out" as used herein, refers to the process of substantially removing sacrificial material present in a layer by pyrolysis or combustion while leaving thermally stable materials substantially intact (backfill, inorganic nanomaterials, receptor substrate).

The term "bake-out temperature" as used herein, refers to the maximum temperature reached during the process of substantially removing sacrificial materials in a layer by pyrolysis or combustion while leaving thermally stable materials substantially intact (backfill, inorganic nanomaterials, receptor substrate).

The terms "combust" or "combustion" as used herein, refer to a process of heating a layer that comprises organic materials in an oxidizing atmosphere so that organic materials undergo a chemical reaction with the oxidant.

The term "ceramic-like" as used herein, refers to a pressure sensitive adhesive layer that has been subjected to a bake-out process to produce a densified layer of nanomaterials. The term "densified layer of nanomaterials" as used herein, refers to a layer with an increased volume fraction of nanomaterials resulting from the pyrolysis or combustion of a layer containing a polymer or other organic constituents and inorganic nanomaterials.

The terms "pyrolyze" or "pyrolysis" as used herein, refer to a process of heating a layer that comprises inorganic nanomaterials in an inert atmosphere so that organic materials in the article decompose by homo- or heterolytic bond cleavage, bond rearrangement, or other processes that serve to fragment organic molecules and create low molecular weight volatile organic products.

The term "structured surface" as used herein, refers to a surface that includes periodic, quasi-periodic or random engineered microstructures, nanostructures, and/or hierarchical structures that can be in a regular pattern or random across the surface. Nanostructures comprise features having at least one dimension (e.g., height, width, or length) less than or equal to 2 micrometers. Microstructures generally comprise features having at least one dimension (e.g., height, width, or length) less than or equal to one millimeter. Hierarchical structures are combinations of nanostructures and microstructures. Typically a "microstructured" surface means that the surface has a configuration of features in which at least 2 dimensions of the features are microscopic. As used herein, the term "microscopic" refers to features of small enough dimension so as to require an optic aid to the naked eye when viewed from a plane of view to determine its shape. One criterion is found in Modern Optical Engineering by W. J. Smith, McGraw-Hill, 1966, pages 104-105 whereby visual acuity "is defined and measured in terms of the angular size of the smallest character that can be recognized." Normal visual acuity is considered to be when the smallest recognizable letter subtends an angular height of 5 minutes of arc on the retina. At a typical working distance of 250 mm (10 inches), this yields a lateral dimension of 0.36 mm (0.0145 inch) for this object.

The term "releasing surface" as used herein refers to a surface that provides low adhesive strength to adhesives, especially pressure sensitive adhesives. Examples of releasing surfaces include the surfaces of release liners. The terms "releasing substrate" and "release substrate" are used interchangeably and refer to a substrate with a releasing surface.

The term "release liners" as used herein refers to articles containing at least one release surface. When adhered to an adhesive layer, release liners adhere only lightly and are easily removed. A release liner may be a single layer (with only the base layer) or it may be a multilayer construction (with one or more coatings or additional layers in addition to the base layer). The release liner may also contain a structure or pattern such as a microstructure.

The term "thermally stable" as used herein, refers to materials that remain substantially intact during the removal of sacrificial materials.

The term "sacrificial" as used herein, refers to material that are the opposite of thermally stable materials, that is to say they are materials that during bake-out are essentially entirely removed. Sacrificial materials can be pyrolyzed by subjecting them to thermal conditions that can vaporize substantially all of the organic material present in the sacrificial layers. These sacrificial layers can also be subjected to combustion to burn out all of the organic material present in the sacrificial layer.

The terms "setting", "curing", and "reacting" are used interchangeably to describe the reaction or polymerization of reactive groups in a reactive composition to form a polymeric composition that is no longer reactive. The setting, curing, or reacting may or may not involve crosslinking.

The terms "room temperature" and "ambient temperature" are used interchangeably to mean temperatures in the range of 20° C. to 25° C.

The terms "Tg" and "glass transition temperature" are used interchangeably. If measured, Tg values are determined by Differential Scanning calorimetry (DSC) at a scan rate of 10° C./minute, unless otherwise indicated. Typically, Tg values for copolymers are not measured but are calculated using the well-known Fox Equation, using the monomer Tg values provided by the monomer supplier, as is understood by one of skill in the art The term "hydrocarbon group" as used herein refers to any monovalent group that contains primarily or exclusively carbon and hydrogen atoms. Alkyl and aryl groups are examples of hydrocarbon groups.

The term "hydrocarbon-based layer" refers to a layer that primarily comprises carbon and hydrogen and may also contain heteroatoms or heteroatom groups such as silicon, oxygen, nitrogen, sulfur, etc atoms, (meth)acrylate groups, silicone groups, and the like.

The term "adjacent" as used herein when referring to two layers means that the two layers are in proximity with one another with no intervening open space between them. They may be in direct contact with one another (e.g. laminated together) or there may be intervening layers.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, $—CH_2CH_2(OCH_2CH_2)_nOCH_2CH_2—$.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula $—R^a—Ar^a—$ where $R^a$ is an alkylene and $Ar^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth)acrylate groups.

As used herein, the term "hydroxyl-functional" refers to reactive materials such as (meth)acrylate monomers that contain terminal hydroxyl (—OH) groups.

The terms "free radically polymerizable" and "ethylenically unsaturated" are used interchangeably and refer to a reactive group which contains a carbon-carbon double bond which is able to be polymerized via a free radical polymerization mechanism.

Unless otherwise indicated, "optically transparent" refers to an article, film or adhesive that has a high light transmittance over at least a portion of the visible light spectrum (about 400 to about 700 nm). Typically, optically transparent articles have a visible light transmittance of at least 90%. The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze, typically less than about 5%, or even less than about 2%. In some embodiments, optically clear articles exhibit a haze of less than 1% at a thickness of 50 micrometers or even 0.5% at a thickness of 50 micrometers. Typically, optically clear articles have a visible light transmittance of at least 95%, often higher such as 97%, 98% or even 99% or higher. Optically clear adhesives or articles are generally color neutral on the CIE Lab scale, with the a orb values being less than 0.5.

The term "polymer" as used herein refers to macromolecules containing at least one type of repeating unit. The term polymer encompasses relatively low molecular weight macromolecules which are often referred to as "oligomers" as well as relatively high molecular weight macromolecules. The term polymer encompasses both homopolymers which include only one type of repeating unit and copolymers which include more than one type of repeating unit. As used herein when the term "molecular weight" is used it refers to number average molecular weights unless otherwise indicated. Molecular weights are in units of grams/mole or Daltons.

Disclosed herein are adhesive layers comprising a cured copolymer prepared from a free radically polymerizable reaction mixture. The free radically polymerizable reaction mixture comprises at least one alkyl (meth)acrylate, at least one ethylenically unsaturated silane, and an initiator. In many embodiments, the free radically polymerizable reaction mixture also comprises at least one copolymerizable ethylenically unsaturated compound that is free of acidic or basic groups. The adhesive layer is a pressure sensitive adhesive at room temperature and is convertible into a ceramic-like layer by bake-out at a temperature of from 170-500°. The individual components of the adhesive layer are described in greater detail below.

It has been found that the presence of monomers which contain acidic or basic groups can be detrimental in the adhesive compositions of the present disclosure. Because the free radically polymerizable reaction mixture comprises at least one alkyl (meth)acrylate, and at least one ethylenically unsaturated silane, the presence of acidic or basic groups can function to catalyze the condensation reaction of the silane-functional materials and thus cause premature gelation. Therefore monomeric ethylenically unsaturated compounds that contain acidic or basic groups, such as acidic or basic (meth)acrylate monomers, are not generally suitable for use in the adhesive compositions of this disclosure.

The term "free of acidic or basic groups" as used herein refers to materials that are free of groups that are acidic or basic according to the standard, well understood meaning of the term according the Bronsted-Lowry definition. In this definition an acid is a compound that can give a hydronium ion (H+) to another compound, and a base is a compound that can receive a hydronium ion from another compound. The propensity of compounds to function as an acid or a base can be predicted by the pKa value for the compound. Generally, suitable materials that are free of acidic or basic groups have pKa values in the range of 12-14.

Acid-functional and/or basic functional (meth)acrylate monomers are commonly used in (meth)acrylate-based pressure sensitive adhesive compositions as reinforcing monomers. These reinforcing monomers help to increase the cohesive strength of the pressure sensitive adhesive matrix. As will be described in greater detail below, rather than acid-functional and/or basic functional (meth)acrylate monomers, hydroxyl-functional monomers have been found to be suitable for use in the adhesive compositions of this disclosure.

The free radically polymerizable reaction mixture comprises at least one monoethylenically unsaturated alkyl acrylate or methacrylate (i.e., (meth)acrylic acid ester), where the alkyl group of the (meth)acrylate has an average of about 4 to about 20 carbon atoms. In some embodiments, the (meth)acrylate alkyl group has an average of about 4 to about 14 carbon atoms. The alkyl group can optionally contain oxygen atoms in the chain thereby forming ethers or alkoxy ethers, for example. Examples of suitable (meth)acrylates include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate.

Optionally, other free radically polymerizable monomers may be included with the at least one alkyl (meth)acrylate. Examples of suitable monomers include other alkyl (meth)acrylate monomers, vinyl monomers, and reinforcing monomers. Alkyl (meth)acrylates are described above. Examples of suitable vinyl monomers include vinyl acetate, styrene, and substituted styrenes.

Free radically copolymerizable reinforcing monomers are monomers which copolymerize with the alkyl (meth)acrylate monomer or monomers to form a copolymer with increased glass transition temperature and cohesive strength compared to a polymer formed of the alkyl (meth)acrylate monomer or monomers alone. Generally, the reinforcing monomers have a homopolymer Tg of at least about 10° C. Typically, the reinforcing monomer is a reinforcing (meth)acrylic monomer. Examples of reinforcing monomers include, but are not limited to, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenyl acrylate, t-butylphenyl acrylate, cyclohexyl acrylate, dimethyladamantyl acrylate, 2-naphthyl acrylate, and phenyl acrylate. Combinations of various reinforcing monomers can also be used.

The reaction mixture additionally comprises at least one ethylenically unsaturated silane. Any suitable ethylenically unsaturated silane may be used. Such monomers contain a terminal ethylenically unsaturated group and a terminal silane group and may be described by the general formula:

$$X\text{-}L_1\text{-}SiY^1Y^2Y^3 \qquad \text{Formula 1}$$

wherein X comprises an ethylenically unsaturated group; $L_1$ is a single covalent bond or a divalent linking group; and each of $Y^1$, $Y^2$, and $Y^3$ is independently a hydrolysable group or an alkyl group.

Examples of ethylenically unsaturated groups include vinyl groups and (meth)acrylate groups. The (meth)acrylate group has the general structure $H_2C=CHR-C(O)O-$ where $C(O)$ refers to a carbonyl group, namely $C=O$ and R is H (for acrylate groups) and methyl (for methacrylate groups). (Meth)acrylate silanes are particularly useful.

The linking group $L_1$ includes a divalent or higher valency group selected from an alkylene, arylene, heteroalkylene, or combinations thereof and an optional divalent group selected from carbonyl, ester, amide, sulfonamide, or combinations thereof. $L_1$ can be unsubstituted or substituted with an alkyl, aryl, halo, or combinations thereof. The $L_1$ group typically has no more than 30 carbon atoms. In some compounds, the $L_1$ group has no more than 20 carbon atoms, no more than 10 carbon atoms, no more than 6 carbon atoms, or no more than 4 carbon atoms. For example, $L_1$ can be an alkylene, an alkylene substituted with an aryl group, or an alkylene in combination with an arylene or an alkyl ether or alkyl thioether linking group. Suitable examples of linking group $L_1$ include alkylene groups, especially alkylene groups with 1 to about 20 carbon atoms, arylene groups, aralkylene groups and heteroalkylene groups. Particularly useful examples include the alkylene groups ethylene ($-CH_2CH_2-$), propylene ($-CH_2CH_2CH_2-$), butylene ($-CH_2CH_2CH_2CH_2-$), phenylene ($-C_6H_4-$), and the like.

The groups $Y^1$, $Y^2$ and $Y^3$ may be the same or different and may be hydrolysable groups or non-hydrolyzable groups. Typical hydrolysable groups include, for example, acetoxy groups or alkoxy groups. Examples of useful alkoxy groups include, for example, methoxy, ethoxy, propoxy and the like. Typical non-hydrolysable groups which may comprise $Y^1$, $Y^2$ and $Y^3$ include, for example, alkyl, aryl or substituted alkyl groups such as, for example, methyl, ethyl, propyl, phenyl, tolyl, and the like.

Examples of suitable ethylenically unsaturated hydrolysable silane monomers include, for example, vinyl silanes such as vinyltrimethoxysilane, or vinyltriethoxysilane, and (m eth)acryl ate silanes such as, 3-(acryloyloxy)propyltrimethoxysilane, 3-(methacryloyloxy)propyltrimethoxysilane, 3-(acryloyloxy)propyltriethoxysilane, 3-(methacryloyloxy)propyltriethoxysilane, 3-(acryloyloxy)propyltripropoxysilane, 3-(methacryloyloxy)propyltripropoxysilane, {3-(acryloyloxy)propyl}methyldimethoxysilane, {3-(methacryloyloxy)propyl}methyldimethoxysilane, {3-(acryloyloxy)propyl}methyldiethoxysilane, {3-(methacryloyloxy)propyl}methyldiethoxysilane, {3-(acryloyloxy)propyl}methyldipropoxysilane, {3-(methacryloyloxy)propyl}methyldipropoxysilane, {4-(acryloyloxy)butyl}phenyldimethoxysilane, {4-(methacryloyloxy)butyl}phenyldimethoxysilane, {3-(acryloyloxy)propyl}phenyldiethoxysilane, {3-(methacryloyloxy)

propyl}phenyldiethoxysilane, {3-(acryloyloxy) propyl}phenyldipropoxysilane, {3-(methacryloyloxy) propyl}phenyldipropoxysilane, {3-(acryloyloxy) propyl}dimethylmethoxysilane, {3-(methacryloyloxy) propyl}dimethylmethoxysilane, {3-(acryloyloxy) propyl}dimethylethoxysilane, {3-(methacryloyloxy) propyl}dimethylethoxysilane, {3-(acryloyloxy) propyl}phenylmethylmethoxysilane, {3-(methacryloyloxy) propyl}phenylmethylmethoxysilane, {3-(acryloyloxy) propyl}phenylmethylethoxysilane, and {3-(methacryloyloxy)propyl}phenylmethylethoxysilane. Particularly useful is 3-(methacryloyloxy)propyltrimethoxysilane, commonly known as gamma-methacryloxypropyltrimethoxysilane or 3-(trimethoxysilyl)propylmethacrylate which is commercially available as SILQUEST A-174 from Crompton Corp.

Typically the ethylenically unsaturated silane is present in the reaction mixture in relatively small amounts. In some embodiments the ethylenically unsaturated silane is present in amounts ranging from 0.1 to 30% by weight of the total reactive material in the reaction mixture.

In many embodiments, the reaction mixture further comprises at least one copolymerizable ethylenically unsaturated compound that is free of acidic or basic groups. Examples of suitable copolymerizable ethylenically unsaturated compounds that are free of acidic or basic groups are hydroxyl functional (meth)acrylates. Particularly suitable hydroxyl functional (meth)acrylates are hydroxyl ethyl methacrylate (HEMA), hydroxyl ethyl acrylate (HEA), and hydroxyl butyl acrylate (HBA).

Typically the copolymerizable ethylenically unsaturated compound that is free of acidic or basic groups is present in the reaction mixture in relatively small amounts. In some embodiments the copolymerizable ethylenically unsaturated compound that is free of acidic or basic groups is present in amounts ranging from 0.1 to 30% by weight of the total reactive material in the reaction mixture.

The reaction mixture additionally comprises at least one initiator. The at least one initiator is a free radical initiator. The initiator may be a thermal initiator or a photoinitiator. In many embodiments the initiator is a thermal initiator. Thermal initiators are species which generate free radicals upon heating. Many possible thermal free radical initiators are known in the art of vinyl monomer polymerization and may be used. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO compounds manufactured by DuPont, such as VAZO 52 (2,2'-azobis(2,4-dimethylpentanenitrile)), VAZO 64 (2,2'-azobis(2-methylpropanenitrile)), VAZO 67 (2,2'-azobis(2-methylbutanenitrile)), and VAZO 88 (2,2'-azobis(cyclohexanecarbonitrile)). Additional commercially available thermal initiators include, for example, LUPERSOL 130 (2,5-dimethyl-2,5-Di-(t-butylperoxy) hexyne-3) available from Sigma-Aldrich, St. Louis, Mo., and LUPEROX 101 (2,5-dimethyl-2,5-di-(tert-butylperoxoxy)hexane) available from Arkema, Inc., King of Prussia, Pa.

In some embodiments, the initiator may comprise a photoinitiator, meaning that the initiator is activated by light, typically ultraviolet (UV) light. Examples of suitable free radical photoinitiators include DAROCURE 4265, IRGACURE 651, IRGACURE 1173, IRGACURE 819, LUCIRIN TPO, LUCIRIN TPO-L, commercially available from BASF, Charlotte, N.C. Also suitable as initiators are materials that function as photosensitive crosslinkers which are activated by high intensity ultraviolet (UV) light. Two common photosensitive crosslinkers used are benzophenone and copolymerizable aromatic ketone monomers as described in U.S. Pat. No. 4,737,559.

A sufficient amount of initiator typically is used to carry the polymerization to the desired temperature and conversion. The total initiator amount used is typically in the range of about 0.0005 weight % to about 0.5 weight % or in the range of about 0.001 weight % to about 0.1 weight % based on the total monomer content.

The reactive mixture may also optionally include one or more chain transfer agents. Chain transfer agents are well understood in the art. Particularly suitable chain transfer agents are sulfur-containing chain transfer agents such as butyl 3-mercaptopropionate.

In addition to the above reactive components, the reactive mixture may additionally comprise one or more non-reactive additives. Any suitable additive can be used as long as it does interfere with the curing of the reactive components or adversely affect the properties of the cured pressure sensitive adhesive film or the ceramic-like layer formed by bake-out of the pressure sensitive adhesive film layer, such as the optical properties. Examples of suitable non-reactive additives include plasticizers, tackifiers, nanoparticle fillers, bead fillers, antioxidants, viscosity control additives, refractive index modifying agents, or combinations thereof.

Among the particularly suitable non-reactive additives are siloxane tackifying resins. Siloxane tackifying resins, formerly known as silicate tackifying resins, are typically added to polydiorganosiloxane adhesives to provide or enhance adhesive properties. In the present disclosure, the siloxane tackifying resins are not added to enhance tackiness, as the present pressure sensitive adhesives are not siloxane-based, rather these resins are functioning as fillers. While not wishing to be bound by theory, it is believed that the addition of the siloxane tackifying resin can assist in the formation of ceramic-like layer upon bake-out, as these resins have a high —Si—O— content that can participate in the formation of the ceramic-like layer during the bake-out process.

Suitable siloxane tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary siloxane resins include MQ siloxane tackifying resins, MQD siloxane tackifying resins, and MQT siloxane tackifying resins. These siloxane tackifying resins usually have a number average molecular weight in the range of 100 to 50,000 or in the range of 500 to 15,000 and generally have methyl R' groups.

MQ siloxane tackifying resins are copolymeric resins having $R'_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("$T^{OH}$" units), thereby accounting for the silicon-bonded hydroxyl content of the siloxane tackifying resin, and some are bonded only to other $SiO_{4/2}$ units.

Such resins are described in, for example, *Encyclopedia of Polymer Science and Engineering*, vol. 15, John Wiley &

Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M siloxane tackifying resins can be prepared, as described in U.S. Pat. Nos. 5,319,040 (Wengrovius et al.), U.S. Pat. No. 5,302,685 (Tsumura et al.), and U.S. Pat. No. 4,935,484 (Wolfgruber et al.).

Certain MQ siloxane tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the siloxane tackifying resin. This may be accomplished, for example, by reacting hexamethyldisilazane with the siloxane tackifying resin. Such a reaction may be catalyzed, for example, with trifluoroacetic acid. Alternatively, trimethylchlorosilane or trimethylsilylacetamide may be reacted with the siloxane tackifying resin, a catalyst not being necessary in this case.

MQD silicone tackifying resins are terpolymers having $R'_3SiO_{1/2}$ units ("M" units), $SiO_{4/2}$ units ("Q" units), and $R'_2SiO_{2/2}$ units ("D" units) such as are taught in U.S. Pat. No. 2,736,721 (Dexter). In MQD silicone tackifying resins, some of the methyl R' groups of the $R'_2SiO_{2/2}$ units ("D" units) can be replaced with vinyl ($CH_2=CH-$) groups ("$D^{Vi}$" units).

MQT siloxane tackifying resins are terpolymers having $R'_3SiO_{1/2}$ units, $SiO_{4/2}$ units and $R'SiO_{3/2}$ units ("T" units) such as are taught in U.S. Pat. No. 5,110,890 (Butler) and Japanese Kokai HE 2-36234.

Suitable siloxane tackifying resins are commercially available from sources such as Dow Corning, Midland, Mich., Momentive Performance Materials, Waterford, N.Y. and Rhodia Silicones, Rock Hill, S.C. Examples of particularly useful MQ siloxane tackifying resins include those available under the trade designations SR-545 and SR-1000, both of which are commercially available from Momentive Performance Materials, Waterford, N.Y. Such resins are generally supplied in organic solvent and may be employed as received. Blends of two or more siloxane resins can be included in the reactive mixtures of this disclosure.

Typically, if used the siloxane tackifying resin is present in the reactive mixture in an amount of up to 20% by weight based upon the total weight of solids.

Other non-reactive additives that can be used include fillers. Typically, if used, the fillers are ones that are sufficiently small as to not interfere with the optical properties. Examples include fumed silica and nanoparticle fillers.

As mentioned above, the reaction mixture is cured to form a layer of pressure sensitive adhesive. The pressure sensitive adhesive comprises a copolymer formed by the free radical polymerization of the reactive components described above, as well as any non-reactive additives included in the reaction mixture. The properties of pressure sensitive adhesives are well known and are described above. Typically the copolymers of the pressure sensitive adhesives of this disclosure have a Tg of less than 20° C. Often the copolymers have a Tg of 0° C. or even less. Copolymer Tgs can be calculated from the homopolymer Tg values for the reactive components used by the well-known Fox Equation.

The cured pressure sensitive adhesive layer is a free-standing film. Typically, the free-standing film is formed on a releasing substrate to form a transfer tape as will be described in greater detail below. The reactive mixture can be formed into a free-standing film in a variety of ways. Typically, the components of the reactive composition are mixed together to form a reactive composition mixture, and coated onto a releasing substrate, and cured to form the free-standing film. The reactive composition components can be mixed by traditional methods known to those skilled in the art. Such methods include mixing, mechanical rolling, hot melt blending, etc. In some embodiments, the components are mixed in solution. Examples of suitable solvents are described above, and include ethyl acetate, acetone, methyl ethyl ketone, heptane, toluene and mixtures thereof In other embodiments the components are mixed as a 100% solids composition, such as by hot melt mixing. Hot melt mixing can be problematic in embodiments where thermal curing agents are used, but because the reactive components are generally of fairly low molecular weight, mixing to prepare a 100% solids mixture at room temperature is often possible.

The reactive composition mixture can be coated on the releasing substrate in a variety of different ways depending upon the nature of the reactive composition mixture. If the reactive composition mixture contains solvent, the reactive composition mixture can be coated by such methods as knife coating, roll coating, gravure coating, rod coating, curtain coating, and air knife coating. The reactive composition mixture may also be printed by known methods such as screen printing or inkjet printing. The coated reactive composition mixture is then generally dried to remove the solvent. Typically, the coating is subjected to elevated temperatures, such as those supplied by an oven, to expedite drying of the adhesive. If a thermal initiator is used, the same elevated temperatures can also be used to effect curing. Similarly, if the coated reactive composition is a 100% solids composition, exposure to elevated temperature can be used to effect curing. Examples of suitable elevated temperature methods to effect drying and/or curing include the use of ovens, heat lamps and the like. If a photoinitiator is used, curing can be effected by exposure to the appropriate radiation such as UV light supplied by a UV lamp.

In some embodiments, the adhesive layer may be crosslinked. Such crosslinking can be effected through the use of standard crosslinking agents such as multi-functional ethylenically unsaturated monomers. More typically, if crosslinking is desired the crosslinking can be effected through the use of radiation-activatable crosslinking agents such as the photocrosslinking agents 2,4,6-tri(benzoylphenoxy)-1,3,5-triazines as are described in U.S. Pat. No. 6,369,123 (Stark et al.).

In some embodiments, the adhesive layer has desirable optical properties. In some embodiments the adhesive layer, while a pressure sensitive adhesive layer, is optically transparent, or even optically clear. Optically transparent articles have a visible light transmittance of at least 90%, while optically clear articles have a visible light transmittance of at least 95% and a haze of less than 5%. Additionally, in some embodiments, the adhesive layer is optically transparent or even optically clear after bake-out to transform the adhesive layer to a ceramic-like layer.

In some embodiments, the adhesive layer comprises a structured surface, created by a patterned structured template layer. Patterned structured template layers can be formed by depositing a layer of a radiation curable composition onto one surface of a radiation transmissive carrier to provide a layer having an exposed surface, contacting a master with a preformed surface bearing a pattern capable of imparting a three-dimensional structure of precisely shaped and located interactive functional discontinuities including distal surface portions and adjacent depressed surface portions into the exposed surface of the layer of radiation curable composition on said carrier under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of carrier, depositing a layer of curable material onto the carrier, laminating the curable material against a master and curing the curable material using actinic radiation. The resulting roll of carrier with a patterned, structured template disposed thereon can then be rolled up. This method is disclosed, for example, in U.S. Pat. No. 6,858,253 (Williams et al.).

One method to reduce the adhesion of the structured template layer is to apply a release coating to the film. One method of applying a release coating to the surface of the template layer is with plasma deposition. An oligomer or polymer can be used to create a plasma cross-linked release coating. The oligomer or polymer may be in liquid or in solid form prior to coating. Typically the oligomer has a molecular weight greater than 1000. Also, the oligomer typically has a molecular weight less than 10,000 so that the oligomer is not too volatile. An oligomer with a molecular weight greater than 10,000 typically may be too non-volatile, causing droplets to form during coating. In one embodiment, the oligomer has a molecular weight greater than 3000 and less than 7000. In another embodiment, the oligomer has a molecular weight greater than 3500 and less than 5500. Typically, the oligomer has the properties of providing a low-friction surface coating. Suitable oligomers include silicone-containing hydrocarbons, reactive silicone containing trialkoxysilanes, aromatic and aliphatic hydrocarbons, fluorochemicals and combinations thereof. For examples, suitable resins include, but are not limited to, dimethylsilicone, hydrocarbon based polyether, fluorochemical polyether, ethylene teterafluoroethylene, and fluorosilicones. Fluorosilane surface chemistry, vacuum deposition, and surface fluorination may also be used to provide a release coating.

Plasma polymerized thin films constitute a separate class of material from conventional polymers. In plasma polymers, the polymerization is random, the degree of cross-linking is extremely high, and the resulting polymer film is very different from the corresponding "conventional" polymer film. Thus, plasma polymers are considered by those skilled in the art to be a uniquely different class of materials and are useful in the disclosed articles. In addition, there are other ways to apply release coatings to the template layer, including, but not limited to, blooming, coating, coextrusion, spray coating, electrocoating, or dip coating.

Typically the structured surface in the adhesive layer is formed by contacting a structured template layer to the adhesive surface. In many embodiments, the structured template layer is a structured release liner, that is to say a releasing substrate that contains a structured surface. A wide variety of patterns and shapes can be present in the surface of the structured surface of the release liner. The structures may have a wide variety of shapes and sizes. In general the structures are microstructures, meaning that they are microstructural features with at least 2 dimensions of the structures of microscopic size. The microstructural features may assume a variety of shapes. Representative examples include hemispheres, prisms (such as square prisms, rectangular prisms, cylindrical prisms and other similar polygonal features), pyramids, ellipses, grooves (e.g., V-grooves), channels, and the like. In general, it is desirable to include topographical features that promote air egress at the bonding interface when the adhesive layer is laminated to an adherend. In this regard, V-grooves and channels that extend to the edge of the article are particularly useful. The particular dimensions and patterns characterizing the microstructural features are selected based upon the specific application for which the article is intended.

Also disclosed herein are transfer tapes. The transfer tapes of this disclosure are standalone double sided pressure sensitive adhesive films of the adhesive layers described above, and include a carrier layer (release substrate) and may comprise additional layers.

The transfer tapes comprise a release substrate with a first major surface and a second major surface, and a standalone adhesive layer adjacent to at least a portion of the second major surface of the release substrate. The adhesive layer comprises a cured copolymer prepared from a reaction mixture comprising at least one alkyl (meth)acrylate, at least one copolymerizable ethylenically unsaturated compound that is free of acidic or basic groups, at least one ethylenically unsaturated silane, and an initiator. Suitable reactive components for the reaction mixture are described in detail above. The adhesive layer is a pressure sensitive adhesive at room temperature and is convertible into a ceramic-like layer by bake-out at a temperature of from 170-500°.

In some embodiments, the adhesive layer is in contact with the second major surface of the release substrate. In these embodiments, the transfer tape articles are simple articles including only the adhesive layer and the release substrate, and when the exposed adhesive surface of the transfer tape is adhered to a substrate and the release substrate is removed, the resulting laminate has only the adhesive layer adhered to the substrate surface.

In other embodiments, the transfer tape further comprises a backfill layer such that the backfill layer is intermediate between the adhesive layer and the second major surface of the release substrate. Backfill layers are described in greater detail below. In these embodiments, the transfer tape articles are more complex articles, and when the exposed adhesive surface of the transfer tape is adhered to a substrate and the release substrate is removed, the resulting laminate comprises: backfill layer/adhesive layer/substrate. The backfill layer is a curable layer that is at least partially cured prior to the application to the adhesive layer and becomes fully cured during the bake-out. As used herein, the term backfill can refer to the backfill layer either in its cured or its curable state. When the backfill layer is associated with the adhesive layer it is in the curable state, when the backfill layer is associated with the ceramic-like layer it is in the fully cured state.

A wide variety of releasing substrates are suitable. Typically the releasing substrate is a release liner or other film from which the adhesive layer can be readily removed. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like, and combinations thereof). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film. The pressure sensitive adhesive layer, once cured, is a free-standing film not requiring a releasing substrate, but it is often convenient to handle the film on a releasing substrate.

As mentioned above, the releasing substrate may comprise a structured surface, such that when the structured surface is in contact with the adhesive layer or the backfill layer covering the adhesive layer, it can impart a structured surface to the adhesive layer or the backfill layer.

A wide range of release liners with a structured pattern present on its surface (frequently called microstructured release liners) are suitable. Typically the microstructured release liners are prepared by embossing. This means that the release liner has an embossable surface which is contacted to a structured tool with the application of pressure and/or heat to form an embossed surface. This embossed surface is a structured surface. The structure on the embossed surface is the inverse of the structure on the tool surface, that is to say a protrusion on the tool surface will form a depression on the embossed surface, and a depression on the tool surface will form a protrusion on the embossed surface.

Backfill layers are used in a variety of optical articles and are described in, for example, US Patent Publication No. 2014/0021492 (Wolk et al.). The backfill layer is a curable, thermally stable layer, such that the bake-out process fully cures the backfill layer. Typically, backfill layers are not tacky after they are fully cured. Materials that may be used for the thermally stable backfill include polysiloxane resins, polysilazanes, polyimides, silsesquioxanes of bridge or ladder-type, silicones, and silicone hybrid materials and many others. These molecules typically have an inorganic core which leads to high thermal stability, mechanical strength, and chemical resistance, and an organic shell that helps with solubility and reactivity. There are many commercial sources of these materials, which are summarized in Table A below.

Different varieties of the above materials can be synthesized with higher refractive index by incorporating nanoparticles or metal oxide precursors in with the polymer resin. Silecs SC850 material is a modified silsesquioxane (n≈1.85). Other materials include a copolymer of methyltrimethoxysilane (MTMS) and bistriethoxysilylethane (BTSE) (Ro et. al, Adv. Mater. 2007, 19, 705-710). This synthesis forms readily soluble polymers with very small, bridged cyclic cages of silsesquioxane. This more flexible structure leads to increased packing density and mechanical strength of the coating. The ratio of these copolymers can be tuned for very low coefficient of thermal expansion, low porosity and high modulus.

TABLE A

Thermally stable mold materials of both low and high refractive index

| Material Name or Trade Designation | Type | Available from |
|---|---|---|
| TecheGlas GRx resins | T-resin (methyl silsesquioxane) | TechneGlas (Perrysburg, Ohio) |
| HSG-510 | T-resin (methyl silsesquioxane) | Hitachi Chemical (Tokyo, Japan) |
| ACCUGLASS 211 | T-Q resin (methyl silsesquioxane) | Honeywell (Tempe, AZ) |
| Hardsil AM | silica nanocomposite | Gelest Inc (Morrisville, PA) |
| MTMS-BTSE Copolymer (Ro et. al, Adv. Mater. 2007, 19, 705-710) | bridged silsesquioxane | National Institute of Standards and Technology (Gaithersburg, MD) |
| PermaNew6000 | silica-filled methyl-polysiloxane polymer containing a latent heat-cure catalyst system | California Hardcoat (Chula Vista, CA) |
| FOX Flowable OXide | Hydrogen Silsesquioxane | Dow Corning (Midland, MI) |
| Ormocer, Ormoclad, Ormocore | silicone hybrid | Micro Resist GmBH (Berlin, Germany) |
| Silecs SCx resins | silicone hybrid (n = 1.85) | Silecs Oy (Espoo, Finland) |
| Ceraset resins | polysilazanes | KiON Specialty Polymers (Charlotte, NC) |
| Bolton metals | low melting metal | Bolton Metal Products (Bellafonte, PA) |

In many embodiments the backfill layer consists of highly branched organosilicon oligomers and polymers of a general formula:

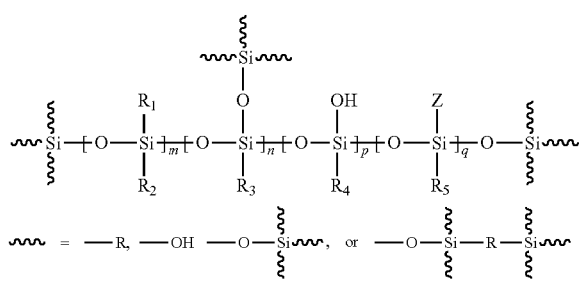

$R_1$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ aryialkyll group, a substituted or unsubstituted $C_1$ to $C_{20}$ heteroalkyl group, a substituted or unsubstituted $C_2$ to $C_{20}$ heterocycloalkyl group, and/or combinations of these;

$R_2$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_3$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted. $C_2$ to $C_{20}$ heterocycloalkyl group, and/or combinations of these;

$R_4$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

$R_5$ is selected from hydrogen, substituted or unsubstituted $C_1$-$C_{20}$ alkyl, substituted or unsubstituted $C_2$-$C_{10}$ alkylene, substituted or unsubstituted $C_2$-$C_{20}$ alkenylene, $C_2$-$C_{20}$ alkynylene, substituted or unsubstituted $C_3$-$C_{20}$ cycloalkyl, substituted or unsubstituted $C_6$-$C_{20}$ aryl, substituted or unsubstituted $C_6$-$C_{20}$ arylene, a substituted or unsubstituted $C_7$ to $C_{20}$ arylalkyl group, a substituted or unsubstituted $C_1$ to $C_{20}$ heteroalkyl group, a substituted or unsubstituted $C_2$ to $C_{20}$ heterocycloalkyl group, and/or combinations of these;

Z is a hydrolyzable group, such as halogen(containing the elements F, Br, Cl, or I), $C_1$-$C_{20}$ alkoxy, C—$C_{20}$ aryloxy, and/ or combinations of these.

m is an integer from 0 to 500;
n is an integer from 1 to 500;
p is an integer from 0 to 500;
q is an integer from 0 to 100.

As used herein, the term "substituted" refers to one substituted with at least a substituent selected from the group consisting of a halogen (containing the elements F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, alkyl group, a $C_2$ to $C_{20}$ alkenyl group, a $C_2$ to $C_{20}$ alkynyl group, $C_6$ to $C_{30}$ aryl group, a $C_7$ to $C_{13}$ arylalkyl group, a $C_1$ to $C_4$ oxyalkyl group, a $C_1$ to $C_{20}$ heteroalkyl group, a $C_3$ to $C_{20}$ heteroarylalkyl group, a $C_3$ to $C_{30}$ cycloalkyl group, a $C_3$ to $C_{15}$ cycloalkenyl group, a $C_6$ to $C_{15}$ cycloalkynyl group, a heterocycloalkyl group, and a combination thereof, instead of hydrogen of a compound.

The resulting highly branched organosilicon polymer has a molecular weight in a range from 150 to 300,000 Da or generally in a range from 150 to 30,000 Da.

Typically, the thermally stable backfill contains the reaction product of the hydrolysis and condensation of a methyltriethoxysilane precursor in a polar solvent. After synthesis, the resulting polymer generally has a molecular weight of nominally less than 30,000 Da. The thermally stable backfill solution also generally includes less than fifty percent by weight silica nanoparticles nominally of a size between 10-50 nanometers.

The thermally stable compositions described herein generally comprise inorganic nanoparticles. These nanoparticles can be of various sizes and shapes. The nanoparticles can have an average particle diameter less than about 1000 nm, less than about 100 nm, less than about 50 nm, or from 5nm to about 3 nm to about 50 nm. The nanoparticles can have an average particle diameter from about 3 nm to about 50 nm, or from about 3 nm to about 35 nm, or from about 5 nm to about 25 nm. If the nanoparticles are aggregated, the maximum cross sectional dimension of the aggregated particle can be within any of these ranges, and can also be greater than about 100 nm. "Fumed" nanoparticles, such as silica and alumina, with primary size less than about 50 nm, may also be used, such as CAB-OSPERSE PG 002 fumed silica, CAB-O-SPERSE 2017A fumed silica, and CAB-OSPERSE PG 003 fumed alumina, available from Cabot Co. Boston, Mass. Their measurements can be based on transmission electron microscopy (TEM). Nanoparticles can be substantially fully condensed. Fully condensed nanoparticles, such as the colloidal silicas, typically have substantially no hydroxyls in their interiors. Non-silica containing fully condensed nanoparticles typically have a degree of crystallinity (measured as isolated particles) greater than 55%, typically greater than 60%, and more typically greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index. Various shapes of the inorganic or organic nanoparticles may be used, such as sphere, rod, sheet, tube, wire, cube, cone, tetrahedron, and the like.

The size of the particles is generally chosen to avoid significant visible light scattering in the final article. The nanomaterial selected can impart various optical properties (i.e refractive index, birefringence), electrical properties (e.g conductivity), mechanical properties (e.g toughness, pencil hardness, scratch resistance) or a combination of these properties. It may be desirable to use a mix of organic and inorganic oxide particle types to optimize an optical or material property and to lower total composition cost.

Examples of suitable inorganic nanoparticles include metal nanoparticles or their respective oxides, including the elements zirconium (Zr), titanium (Ti), hafnium (Hf), aluminum (Al), iron (Fe), vanadium (V), antimony (Sb), tin (Sn), gold (Au), copper (Cu), gallium (Ga), indium (In), chromium (Cr), manganese (Mn), cobalt (Co), nickel (Ni), zinc (Zn), yttrium (Y), niobium (Nb), molybdenum (Mo), technetium (Te), ruthenium (Ru), rhodium (Rh), palladium (Pd), silver (Ag), cadmium (Cd), lanthanum (La), tantalum (Ta), tungsten (W), rhenium (Rh), osmium (Os), iridium (Ir), platinum (Pt), and any combinations thereof.

In a specific embodiment, nanoparticles of zirconium oxide (zirconia) are used. Zirconia nanoparticles can have a particle size from approximately 5 nm to 50 nm, or 5 nm to 15 nm, or 10 nm. Zirconia nanoparticles can be present in the durable article or optical element in an amount from 10 to 70 wt %, or 30 to 50 wt %. Zirconias for use in materials of the invention are commercially available from Nalco Chemical Co. (Naperville, Ill.) under the product designation NALCO OOSSOO8 and from Buhler AG Uzwil, Switzerland under the trade designation "Buhler zirconia Z-WO sol". Zirconia nanoparticle can also be prepared such as described in U.S. Pat. No. 7,241,437 (Davidson et al.) and U.S. Pat. No. 6,376,590 (Kolb et al.). Titania, antimony oxides, alumina, tin oxides, and/or mixed metal oxide nanoparticles can be present in the durable article or optical element in an amount from 10 to 70 wt %, or 30 to 50 wt %. Densified ceramic oxide layers may be formed via a "sol-gel" process, in which ceramic oxide particles are incorporated into a gelled dispersion with a precursor of at least one modifying component followed by dehydration and firing, as described in U.S. Pat. No. 5,453,104 (Schwabel). Mixed metal oxide for use in materials of the invention are commercially available from Catalysts & Chemical Industries Corp., (Kawasaki, Japan) under the product designation OPTOLAKE.

Other examples of suitable inorganic nanoparticles include elements and alloys known as semiconductors and their respective oxides such as silicon (Si), germanium (Ge), silicon carbide (SiC), silicon germanide (SiGe), aluminium nitride (AlN), aluminium phosphide (AlP), boron nitride (BN), boron carbide ($B_4C$), gallium antimonide (GaSb), indium phosphide (InP), gallium arsenide nitride (GaAsN), gallium arsenide phosphide (GaAsP), indium aluminum arsenide nitride (InAlAsN), zinc oxide (ZnO), zinc selenide (ZnSe), zinc sulfide (ZnS), zinc telluride (ZnTe), mercury zinc selenide (HgZnSe), lead sulfide (PbS), lead telluride (PbTe), tin sulfide (SnS), lead tin telluride (PbSnTe), thallium tin telluride ($Tl_2SnTe_5$), zinc phosphide ($Zn_3P_2$), zinc arsenide ($Zn_3As_2$), zinc antimonide ($Zn_3Sb_2$), lead(II) iodide ($PbI_2$), copper(I) oxide ($Cu_2O$).

Silicon dioxide (silica) nanoparticles can have a particle size from 5 nm to 75 nm or 10 nm to 30 nm or 20 nm. Silica nanoparticles are typically in an amount from 10 to 60 wt.-%. Typically the amount of silica is less than 40 wt %. Suitable silicas are commercially available from Nalco Chemical Co. (Naperville, Ill.) under the trade designation NALCO COLLOIDAL SILICAS. For example, silicas include NALCO trade designations 1040, 1042, 1050, 1060, 2327 and 2329, the organosilica under the product name IPA-ST-MS, IPA-ST-L, IPA-ST, WA-ST-UP, MA-ST-M, and MAST sols from Nissan Chemical America Co. Houston, Tex. and the SNOWTEX ST-40, ST-50, ST-20L, ST-C, ST-N, ST-O, ST-OL, ST-ZL, ST-UP, and ST-OUP, also from Nissan Chemical America Co. Houston, Tex. Suitable fumed silicas include for example, products sold under the tradename, AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, The weight ratio of polymerizable material to nanoparticles can range from about 30:70, 40:60, 50:50, 55:45, 60:40, 70:30, 80:20 or 90:10 or more. The desired ranges of weight percent of nanoparticles range from about 10 wt % to about 60% by weight, and can depend on the density and size of the nanoparticle used.

Within the class of semiconductors include nanoparticles known as "quantum dots," which have interesting electronic and optical properties that can be used in a range of applications. Quantum dots can be produced from binary alloys such as cadmium selenide, cadmium sulfide, indium arsenide, and indium phosphide, or from ternary alloys such as cadmium selenide sulfide, and the like. Companies that sell quantum dots include Nanoco Technologies (Manchester, UK) and Nanosys (Palo Alto, Calif.).

Examples of suitable inorganic nanoparticles include elements known as rare earth elements and their oxides, such as lanthanum (La), cerium ($CeO_2$), praseodymium ($Pr_6O_{11}$), neodymium ($Nd_2O_3$), samarium ($Sm_2O_3$), europium ($Eu_2O_3$), gadolinium ($Gd_2O_3$), terbium ($Tb_4O_7$), dysprosium ($Dy_2O_3$), holmium ($Ho_2O_3$), erbium ($Er_2O_3$), thulium ($Tm_2O_3$), ytterbium ($Yb_2O_3$) and lutetium ($Lu_2O_3$). Additionally, phosphorecent materials known as "phosphors" may be included in the thermally stable backfill material. These may include calcium sulfide with strontium sulfide with bismuth as an activator ($Ca_xSr$)S: Bi, Zinc sulfide with copper "GS phosphor", mixtures of zinc sulfide and cadmium sulfide, strontium aluminate activated by Europium ($SrAl_2O_4$:Eu(II):Dy(III)), $BaMgAl_{10}O_{17}:Eu^{2+}$ (BAM), $Y_2O_3$:Eu, doped ortho-silicates, Yttrium aluminium garnet (YAG) and Lutetium aluminium garnet (LuAG) containing materials, any combinations thereof, and the like. A commercial example a phosphor may include one of the ISIPHO inorganic phosphors (available from Merck KGaA, Darmstadt, Germany).

The nanoparticles are typically treated with a surface treatment agent. Surface-treating the nano-sized particles can provide a stable dispersion in the polymeric resin. Desirably, the surface-treatment stabilizes the nanoparticles so that the particles will be well dispersed in a substantially homogeneous composition. Furthermore, the nanoparticles can be modified over at least a portion of its surface with a surface treatment agent so that the stabilized particle can copolymerize or react with the parts of the composition during curing. In general, a surface treatment agent has a first end that will attach to the particle surface (covalently, ionically or through strong physisorption) and a second end that imparts compatibility of the particle with the composition and/or reacts with resin during curing. Examples of surface treatment agents include alcohols, amines, carboxylic acids, sulfonic acids, phosphonic acids, silanes and titanates. The desired type of treatment agent is determined, in part, by the chemical nature of the metal oxide surface. Silanes are desired for silica and other for siliceous fillers. Silanes and carboxylic acids are desired for metal oxides such as zirconia. The surface modification can be done either subsequent to mixing with the monomers or after mixing. It is desired in the case of silanes to react the silanes with the particle or nanoparticle surface before incorporation into the composition. The required amount of surface modifier is dependent upon several factors such particle size, particle type, modifier molecular weight, and modifier type. In general it is desirable that approximately a monolayer of modifier is attached to the surface of the particle. The attachment procedure or reaction conditions required also depend on the surface modifier used. For silanes, it is desirable to surface treat at elevated temperatures under acidic or basic conditions for from 1-24 hr approximately. Surface treatment agents such as carboxylic acids may not require elevated temperatures or extended time.

Representative embodiments of surface treatment agents suitable for the compositions include compounds such as, for example, isooctyl trimethoxy-silane, N-(3-triethoxysilyl-propyl) methoxyethoxyethoxyethyl carbamate (PEG3TES), N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy) silane, styrylethyltrimethoxysilane, mercaptopropyltrimethoxysilane, 3-5 glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof. Further, a proprietary silane surface modifier, commercially available from OSI Specialties, Crompton South Charleston, W. Va. under the trade designation "Silquest A1230", has been found particularly suitable.

In some embodiments the thermally stable molecular species includes a metal, metal oxide or metal oxide precursor. Metal oxide precursors may be used in order to act as an amorphous "binder" for inorganic nanoparticles, or they may be used alone. Sol-gel techniques may be used to react these precursors in order to cure the material into a solid mass and are known to those skilled in the art. Suitable metal oxide precursors include alkyl titanates such as titanium (IV) butoxide, n-propyl titanate, titanium triethanolamine, titanium phosphate glycol, 2-ethylhexyl titanate, titanium (IV) ethoxide, titanium (IV) isopropoxide, and the like. These are commercially available under the "TYZOR" trade name owned by Dorf-Ketal Inc. (Houston, Tex.). Also suitable metal oxide precursors include zirconium chloride or zirconium(IV) alkoxides such as zirconium (IV) acrylate, zirconium(IV) tetraisopropoxide, zirconium(IV) tetraethoxide, zirconium(IV) tetrabutoxide, and the like, all available from Aldrich (St. Louis, Mo.). Also suitable metal oxide precursors include hafnium(IV) chloride or hafnium alkoxides such as hafnium(IV) carboxyethyl acrylate, hafnium (IV) tetraisopropoxide, hafnium(IV) tert-butoxide, hafnium (IV) n-butoxide, also available from Aldrich (St. Louis, Mo.).

Besides the adhesive layer and the optional thermally stable backfill layer, the articles may also comprise an optional sacrificial layer. The sacrificial layer is a material layer that is removed during bake-out, in contrast with the backfill layer, which is thermally stable and thus is not removed during the bake-out. The sacrificial layer is a material capable of being baked-out or otherwise removed while leaving the adjacent layer, such as for example a structured adjacent layer, substantially intact. An example of such an adjacent layer is a structured backfill layer. One can view the sacrificial layers as removable scaffolding which support the structured surface of the thermally stable backfill layer until the bake-out step when the backfill layer is fully cured and the adhesive layer is converted to a ceramic-like layer.

In some embodiments, the sacrificial layer is a release layer. In these embodiments, a release substrate is contacted to the adhesive layer or more typically to a layer adjacent to the adhesive layer (such as a backfill layer). Instead of the entire release substrate being peeled off and removed to leave an exposed adhesive or backfill layer, the backing layer of the release substrate can be peeled away leaving a releasing layer in contact with the adhesive or backfill layer. In this way the release layer becomes a sacrificial layer and is removed during the bake-out. In embodiments where the entire release substrate is removed, there is no sacrificial layer left on the surface of the adhesive or backfill layer. In these embodiments, if a sacrificial layer is desired, the sacrificial layer can be added to the exposed surface of the adhesive or backfill layer after the removal of the release substrate.

The sacrificial layer if used, can comprise any material as long as the desired properties are obtained. Generally, the sacrificial layer is made from a polymerizable composition comprising polymers having number average molecular weights of about 1,000 Da or less (e.g., monomers and oligomers). Particularly suitable monomers or oligomers have molecular weights of about 500 Da or less, and even more particularly suitable polymerizable molecules have molecular weights of about 200 Da or less. The polymerizable compositions are typically cured using actinic radiation, e.g., visible light, ultraviolet radiation, electron beam radiation, heat and combinations thereof, or any of a variety of conventional anionic, cationic, free radical or other polymerization techniques, which can be photochemically or thermally initiated.

Useful polymerizable compositions for forming sacrificial layers comprise curable functional groups known in the art, such as epoxide groups, allyloxy groups, (meth)acrylate groups, epoxide, vinyl, hydroxyl, acetoxy, carboxylic acid, amino, phenolic, aldehyde, cinnamate, alkene, alkyne, ethylenically unsaturated groups, vinyl ether groups, and any derivatives and any chemically compatible combinations thereof.

The polymerizable composition used to prepare the sacrificial template layer may be monofunctional or multifunctional (e.g, di-, tri-, and tetra-) in terms of radiation curable moieties. Examples of suitable monofunctional polymerizable precursors include styrene, alpha-methyl styrene, substituted styrene, vinyl esters, vinyl ethers, octyl (meth)acrylate, nonylphenol ethoxylate (meth)acrylate, isobornyl (meth)acrylate, isononyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, cycloaliphatic epoxide, alpha-epoxide, 2-hydroxyethyl (meth)acrylate, isodecyl (meth)acrylate, dodecyl (meth)acrylate, n-butyl (meth)acrylate, methyl (meth)acrylate, hexyl (meth)acrylate, (meth)acrylic acid, N-vinylcaprolactam, stearyl (meth)acrylate, hydroxyl functional caprolactone ester (meth)acrylate, isooctyl (meth)acrylate, hydroxyethyl (meth)acrylate, hydroxypropyl (meth)acrylate, hydroxyisopropyl (meth)acrylate, hydroxybutyl (meth)acrylate, hydroxyisobutyl (meth)acrylate, tetrahydrofuryl (meth)acrylate, and any combinations thereof.

Examples of suitable multifunctional polymerizable precursors include ethyl glycol di(meth)acrylate, hexanediol di(meth)acrylate, triethylene glycol di(meth)acrylate, tetraethylene glycol di(meth)acrylate, trimethylolpropane tri(meth)acrylate, trimethylolpropanepropane tri(meth)acrylate, glycerol tri(meth)acrylate, pentaerythritol tri(meth)acrylate, pentaerythritol tetra(meth)acrylate, neopentyl glycol di(meth)acrylate, bisphenol A di(meth)acrylate, poly (1,4-butanediol) di(meth)acrylate, any substituted, ethoxylated or propoxylated versions of the materials listed above, or any combinations thereof.

The polymerization reactions generally lead to the formation of a three-dimensional "crosslinked" macromolecular network and are also known in the art as negative-tone photoresists, as reviewed by Shaw et al., "Negative photoresists for optical lithography," IBM Journal of Research and Development (1997) 41, 81-94. The formation of the network may occur through either covalent, ionic, or hydrogen bonding, or through physical crosslinking mechanisms such as chain entanglement. The reactions can also be initiated through one or more intermediate species, such as free-radical generating photoinitiators, photosensitizers, photoacid generators, photobase generators, or thermal acid generators. The type of curing agent used depends on the polymerizable precursor used and on the wavelength of the radiation used to cure the polymerizable precursor. Examples of suitable commercially available free-radical generating photoinitiators include benzophenone, benzoin ether, and acylphosphine photoinitiators, such as those sold under the trade designations "IRGACURE" and "DARO-CUR" from Ciba Specialty Chemicals, Tarrytown, N.Y. Other exemplary photoinitiators include 2,2-dimethoxy-2-phenylacetophenone (DMPAP), 2,2-dimethoxyacetophenone (DMAP), xanthone, and thioxanthone.

Co-initiators and amine synergists may also be included to improve curing rates. Suitable concentrations of the curing agent in the crosslinking matrix range from about 1 wt. % to about 10 wt. %, with particularly suitable concentrations ranging from about 1 wt. % to about 5 wt. %, based on the entire weight of the polymerizable precursor. The polymerizable precursor may also include optional additives, such as heat stabilizers, ultraviolet light stabilizers, free-radical scavengers, and combinations thereof. Examples of suitable commercially available ultraviolet light stabilizers include benzophenone-type ultraviolet absorbers, which are available under the trade designation "UVINOL 400" from BASF Corp., Parsippany, N.J.; under the trade designation "CYASORB UV-1164" from Cytec Industries, West Patterson, N.J.; and under the trade designations "TINUVIN 900," "TINUVIN 123" and "TINUVIN 1130" from Ciba Specialty chemicals, Tarrytown, N.Y. Examples of suitable concentrations of ultraviolet light stabilizers in the polymerizable precursor range from about 0.1 wt. % to about 10 wt. %, with particularly suitable total concentrations ranging from about 1 wt. % to about 5 wt. %, relative to the entire weight of the polymerizable precursor.

Examples of suitable free-radical scavengers include hindered amine light stabilizer (HALS) compounds, hydroxylamines, sterically hindered phenols, and combinations thereof. Examples of suitable commercially available HALS compounds include the trade designated "TINUVIN 292" from Ciba Specialty Chemicals, Tarrytown, N.Y., and the trade designated "CYASORB UV-24" from Cytec Industries, West Patterson, N.J. Examples of suitable concentrations of free radical scavengers in the polymerizable precursor range from about 0.05 wt. % to about 0.25 wt. %.

Patterned structured template layers can be formed by depositing a layer of a radiation curable composition onto one surface of a radiation transmissive carrier to provide a layer having an exposed surface, contacting a master with a preformed surface bearing a pattern capable of imparting a three-dimensional structure of precisely shaped and located interactive functional discontinuities including distal surface portions and adjacent depressed surface portions into the exposed surface of the layer of radiation curable composition on said carrier under sufficient contact pressure to impart said pattern into said layer, exposing said curable composition to a sufficient level of radiation through the carrier to cure said composition while the layer of radiation curable composition is in contact with the patterned surface of the master. This cast and cure process can be done in a continuous manner using a roll of carrier, depositing a layer of curable material onto the carrier, laminating the curable material against a master and curing the curable material using actinic radiation. The resulting roll of carrier with a patterned, structured template disposed thereon can then be rolled up. This method is disclosed, for example, in U.S. Pat. No. 6,858,253 (Williams et al.).

Other materials that are not photopatternable may also be used for the sacrificial layer. These materials are typically thermoplastic materials capable of being embossed using a pre-formed, releasable pattern. These include, polyvinyl alcohol (PVA), ethylcellulose, methylcellulose, polynorbornenes, poly(methylmethacrylate (PMMA), poly(vinylbutyral), poly(cyclohexene carbonate), poly(cyclohexene propylene) carbonate, poly(ethylene carbonate), poly (propylene carbonate) and other aliphatic polycarbonates, and any copolymer or blends thereof, and other materials described in chapter 2, section 2.4 "Binders" of R. E. Mistler, E. R. Twiname, Tape Casting: Theory and Practice, American Ceramic Society, 2000. There are many commercial sources for these materials. These materials are typically easy to remove via dissolution or thermal decomposition via pyrolysis or combustion. Thermal heating is typically part of many manufacturing processes and thus removal of the sacrificial material may be accomplished during an existing heating step. For this reason, thermal decomposition via pyrolysis or combustion is a more desirable method of removal.

There are several properties that are desirable in the sacrificial materials. The material should be capable of being coated onto a substrate via extrusion, knife coating, solvent coating, cast and cure, or other typical coating methods. It is desirable that the material be a solid at room temperature. For thermoplastic sacrificial materials, it is desirable that the glass transition temperature (Tg) is low enough to allow it to be embossed by a heated tool. Thus, it generally the sacrificial material have a Tg above 25° C., more typically above 40° C. or even above 90° C.

Another material property that is desired for the sacrificial material is that its decomposition temperature be above the curing temperature of the backfill material(s). Once the backfill material is cured, the structured layer is permanently formed and the sacrificial template layer can be removed via any one of the methods listed above. Materials that thermally decompose with low ash or low total residue are desired over those that have higher residuals. Residue left behind on a substrate may adversely impact electrical and/or optical properties such as the conductivity, transparency or color of the final product. Since it is desirable to minimize any changes to these properties in the final product, residual levels of less than 1000 ppm are desired. Residuals levels of less than 500 ppm are more desirable and residual level below 50 ppm are most desired.

The term "cleanly baked-out" means that the sacrificial layer can be removed by pyrolysis or combustion without leaving a substantial amount of residual material such as ash. Examples of desired residual levels are provided above, although different residual levels can be used depending upon a particular application.

Also disclosed herein are multilayer articles that can be prepared from the transfer tapes described above. The multilayer articles comprise a receptor substrate comprising a first major surface and a second major surface, and a ceramic-like layer in contact with the second major surface of the receptor substrate. The ceramic-like layer comprises baked-out pressure sensitive adhesive layer that has been baked-out at a temperature of from 170-500° C. The pressure sensitive adhesive layer comprises a cured copolymer prepared from a reaction mixture comprising at least one alkyl (meth)acrylate, at least one copolymerizable ethylenically unsaturated compound that is free of acidic or basic groups, at least one ethylenically unsaturated silane, and an initiator. Suitable reactive components for the reaction mixture are described in detail above. The pressure sensitive adhesive layer may also include additional optional additives, as are described above.

In some embodiments the multilayer article also includes a backfill layer. This article has the configuration: backfill layer/ceramic-like layer/receptor substrate. Thus the backfill layer is located on the ceramic-like layer and is a cured layer that cures during the bake-out process. The exposed surface of the backfill layer may be a structured surface.

A wide array of receptor substrates are suitable for the multilayer articles of this disclosure. Examples of receptor substrates include glass such as display mother glass, lighting mother glass, architectural glass, roll glass, and flexible glass. An example of flexible roll glass is the WILLOW glass product from Corning Incorporated. Other examples of receptor substrates includes metals such as metal sheets and foils. Yet other examples of receptor substrates include sapphire, silicon, silica, silicon carbide, silicon nitride, and semiconductor materials on a support wafer. The receptor substrate may be coated with a primer layer to modify the surface energy of the substrate to allow for better wetting of the adhesive. Examples of primer layers may include ethylenically unsaturated silanes such as 3-(meth)acryloxypropyltrimethoxysilane, and the like.

In some embodiments, the multilayer article comprises a first receptor substrate, pressure sensitive adhesive layer, and release substrate. Such articles can be prepared by laminating a transfer tape as described above to the first receptor substrate. Other embodiments of the multilayer article comprise a first receptor substrate, pressure sensitive adhesive layer, and backfill layer. In these embodiments, the backfill layer can be a component of the transfer tape (i.e. the backfill layer is in contact with the pressure sensitive adhesive layer prior to contact with the first receptor substrate). In other embodiments, the backfill layer can be contacted to the pressure sensitive adhesive layer after the release substrate is removed and prior to the bake-out.

Yet other embodiments of the multilayer article comprise a first receptor substrate, pressure sensitive adhesive layer, and a second receptor substrate. The second receptor substrate is contacted to the pressure sensitive adhesive prior to bake-out, and one of the advantages of the pre-ceramic-like layer having pressure sensitive adhesive properties is that the lamination thus formed holds together both prior to and after bake-out. The second receptor substrate may be any of the receptor substrates described above. The first and second receptor substrates may be the same or they may be different.

Yet another embodiment of the multilayer article is one which comprises a first receptor substrate, pressure sensitive adhesive layer, and a second adhesive layer. The second adhesive layer may be the same composition as the pressure sensitive adhesive layer, or the second adhesive layer may have a different composition than the pressure sensitive adhesive layer. The second adhesive layer, like the pressure sensitive adhesive layer, bakes-out to form a ceramic-like layer. In some embodiments, the pressure sensitive adhesive layer has a structured surface and the second adhesive layer also has a structured surface. Typically the patterned array present on the structured surface of the pressure sensitive adhesive layer is the same or similar to the patterned array present on the structured surface of the second adhesive layer. When this is the case, the second adhesive layer is contacted to the structured pattern on the surface of the pressure sensitive adhesive layer in such a way that the structured patterns are not aligned but rather are orthogonal or substantially non-parallel to each other. In this way, the structured patterns are retained after bake-out, and while not wishing to be bound by theory, it is believed that the presence of the air gaps formed by the presence of the structured surfaces can facilitate the loss of organic components from the adhesive layers during bake-out.

Also disclosed are methods for preparing articles that include the adhesive layers of this disclosure. The method comprises providing a receptor substrate with a first major surface and a second major surface, providing a transfer tape comprising a releasing substrate and a pressure sensitive adhesive layer adjacent to the releasing substrate, applying the transfer tape to the receptor substrate such that the pressure sensitive adhesive layer is in contact with the second major surface of the receptor substrate, removing the releasing substrate from the transfer tape to form a pressure sensitive adhesive layer laminated to the second major surface of the receptor substrate, and baking-out the pressure sensitive adhesive layer at a temperature from 170-500° C., to form a ceramic-like layer on the second major surface of the receptor substrate.

Bake-out is process by which the pressure sensitive adhesive layer is converted to a ceramic-like layer through the application of heat. Typically the heat is supplied by an oven or similar heat source. As with any thermal process, additional factors also affect the bake-out process, such as the rate of heating, the total time of heating, and the like. Also, other external factors influence the bake-out process such as the thermal stability of the receptor substrate, the presence or absence of a backfill layer as will be described below, as well as convenience and cost factors. The temperature and time of the bake-out is selected such to effect the conversion of the pressure sensitive adhesive layer to a ceramic-like layer. Typically, the adhesive layer is heated to a temperature of from between 170-500° C., for a time sufficient to remove the organic components of the adhesive layer. In some embodiments, the bake-out temperature is in the range of 250-500° C. or even 300-500° C. Generally, the adhesive layer is heated for a time of at least 10 minutes. In some embodiments it may be desirable to bake-out for a longer time at a lower temperature, such as, for example, 300° C. or even 400° C. for a time of one hour.

In some embodiments, it may be desirable to "flash heat" the pressure sensitive adhesive layer to achieve bake-out. By "flash heat" it is meant that the pressure sensitive adhesive layer is subjected to high heat at a very rapid rate and for a very short period of time. Flash heating can be effected, for example, through the use of a laser to expose the pressure sensitive adhesive layer to intense, high heat for a very short period of time. With such techniques, because the heating times are so short, more thermally sensitive substrates can be used without being adversely affected.

In some embodiments, the method also includes applying a curable backfill layer to the surface of the pressure sensitive adhesive layer laminated to the second major surface of the receptor substrate prior to baking-out the pressure sensitive adhesive layer laminated to the second major surface of the receptor substrate.

In some embodiments, the adhesive layer also includes a sacrificial layer. The materials suitable for use in the sacrificial layer are described above. The sacrificial layer may be a release layer or a template layer. In cases where the adhesive layer comprises a microstructured surface, a sacrificial layer can be useful to maintain the structures until the bake-out step, at which point the sacrificial layer is removed.

In other embodiments, the transfer tape comprises a releasing substrate, a curable backfill layer in contact with the releasing substrate, and a pressure sensitive adhesive layer in contact with the backfill layer. This type of transfer tape can be prepared in a variety of ways. In some embodiments, an adhesive layer can be formed on a releasing surface. This forming of the adhesive layer on the releasing surface can include the steps of coating, drying, and curing as was described above. The curable backfill layer can be applied on the exposed surface of the cured adhesive layer, but more typically the cured adhesive layer is laminated to the curable backfill layer. A releasing substrate, typically a microstructured template layer, can be placed on the exposed surface of the curable backfill layer to form a construction: releasing substrate/curable backfill layer/adhesive layer/releasing surface. The transfer tape article (releasing substrate/curable backfill layer/adhesive layer) can then be removed from the releasing surface and be applied to a receptor substrate to form a laminate article: releasing substrate/curable backfill layer/adhesive layer/receptor substrate. The releasing substrate can then be removed and the resulting laminate can be baked-out at a temperature of from 170-500° C., to form a laminate construction: backfill layer/ceramic-like layer/receptor substrate. In some embodiments, the releasing substrate is a structured release liner (typically a microstructured release liner) such that the structured surface of the structured release liner contacts the curable backfill layer. Upon removal of the structured release liner, the surface of the curable backfill layer is a structured surface and typically retains this structure upon curing during the bake-out.

In some embodiments, after the releasing substrate is removed from the receptor substrate/adhesive layer/releasing substrate constructions to form a receptor substrate/adhesive layer construction, a second substrate can be contacted to the exposed adhesive layer to form a receptor substrate/adhesive layer/second substrate construction. In many embodiments, the second substrate is another receptor substrate, and the second receptor substrate may be either the same as or different from the first receptor substrate. As mentioned above, one of the advantages of using an adhesive layer as the pre-ceramic-like layer is that the adhesive layer can function as an adhesive layer and in this instance adhere together two substrates.

In some embodiments involving a second substrate, the second substrate may be a second adhesive layer. This second adhesive layer can be the same as or different from the first adhesive layer, as long as the adhesive layer bakes-out at the temperature used for the first adhesive layer. In some embodiments the releasing substrate is a microstructured release liner, and therefore upon removal the first adhesive layer has a microstructured surface. If the second adhesive layer also has a microstructured surface, and if the microstructure features are the same or similar, the adhesive layers are contacted in such a way that the microstructures on the two surfaces are orthogonal or substantially non-parallel to each other.

In some embodiments involving a second substrate, the second substrate may be a second transfer tape article. This second transfer tape article can include a second adhesive layer and a second receptor substrate. The second adhesive layer can be the same as or different from the first adhesive layer, as long as the adhesive layer bakes-out at the temperature used for the first adhesive layer. The second receptor substrate can be the same or different from the first receptor substrate. As mentioned above, the first adhesive layer may have a microstructured surface. If the second adhesive layer also has a microstructured surface, and if the microstructure features are the same or similar, the adhesive layers are contacted in such a way that the microstructures on the two surfaces are orthogonal or substantially non-parallel to each other. Upon bake-out, both adhesive layers form ceramic-like layers, and the formed article comprises a first receptor substrate/first ceramic-like layer/second ceramic-like layer/second receptor substrate. In these embodiments, the presence of microstructures in the adhesive layers can aid in the loss of sacrificial materials from the adhesive layers and the generation of the ceramic-like layers by permitting the egress of volatiles from the adhesive bond line between the two adhesive layers.

The adhesive layers, transfer tapes, multilayer articles, and methods of this disclosure are further illustrated in the Figures.

In FIG. 1, article 100, which is a transfer tape, comprises adhesive layer 120 and release substrate 110. In step 10, transfer tape 100 is contacted to receptor substrate 130 to form multilayer article 101. In step 20, release substrate 110 is removed to generate article 102 which comprises receptor substrate 130 in contact with adhesive layer 120. In step 30, article 102 is baked-out as described above to generate article 103 which comprises receptor substrate 130 and ceramic-like layer 121 generated from adhesive layer 120.

Figure 2:
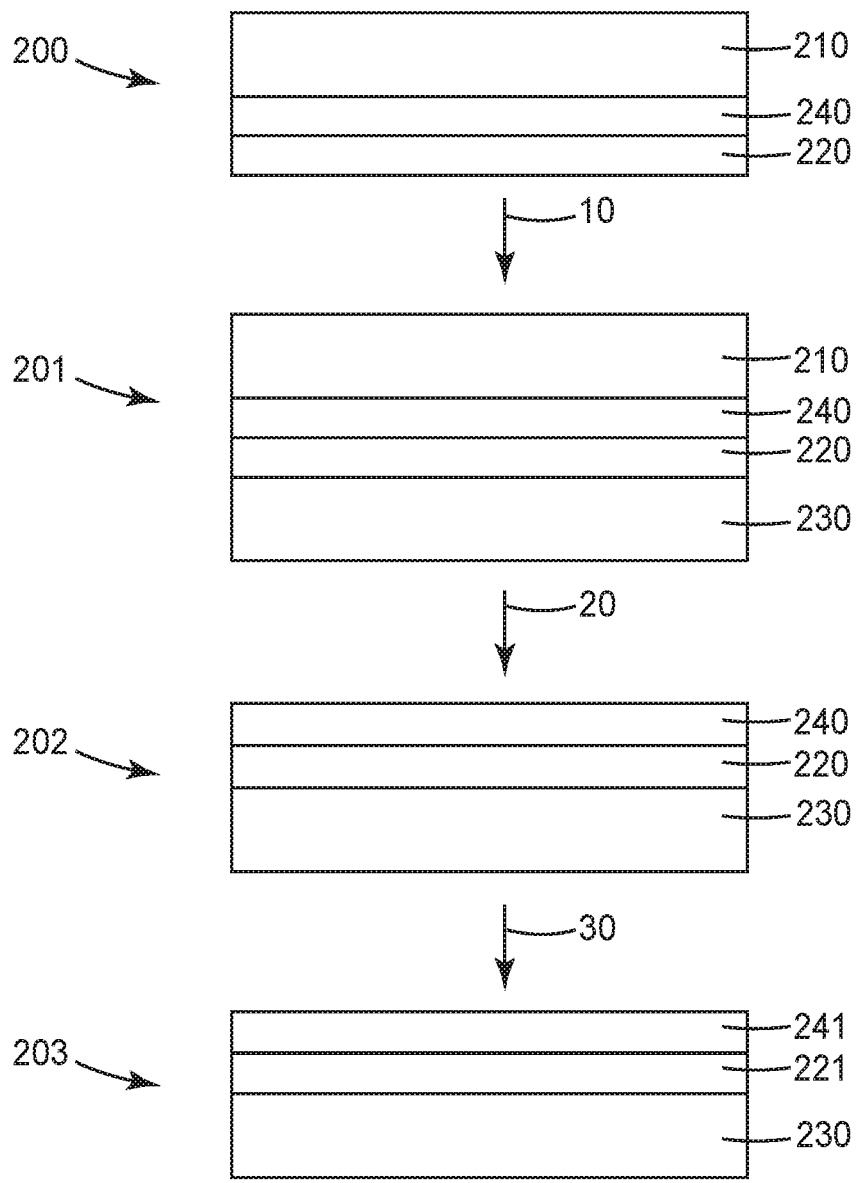
FIG. 2 is a cross sectional view of another embodiment of a process for preparing and using the adhesive layers, transfer tapes, and multilayer articles of the present disclosure.

FIG. 2 describes a similar process as FIG. 1. In FIG. 2, article 200, which is a transfer tape, comprises adhesive layer 220, release substrate 210, and backfill layer 240 between adhesive layer 220 and release substrate 210. In step 10, transfer tape 200 is contacted to receptor substrate 230 to form multilayer article 201. In step 20, release substrate 210 is removed to generate article 202 which comprises receptor substrate 230 in contact with adhesive layer 220, which is contact with backfill layer 240. In step 30, article 202 is baked-out as described above to generate article 203 which comprises receptor substrate 230 and ceramic-like layer 221 generated from adhesive layer 220, and cured backfill layer 241 generated from backfill layer 240.

Figure 3:
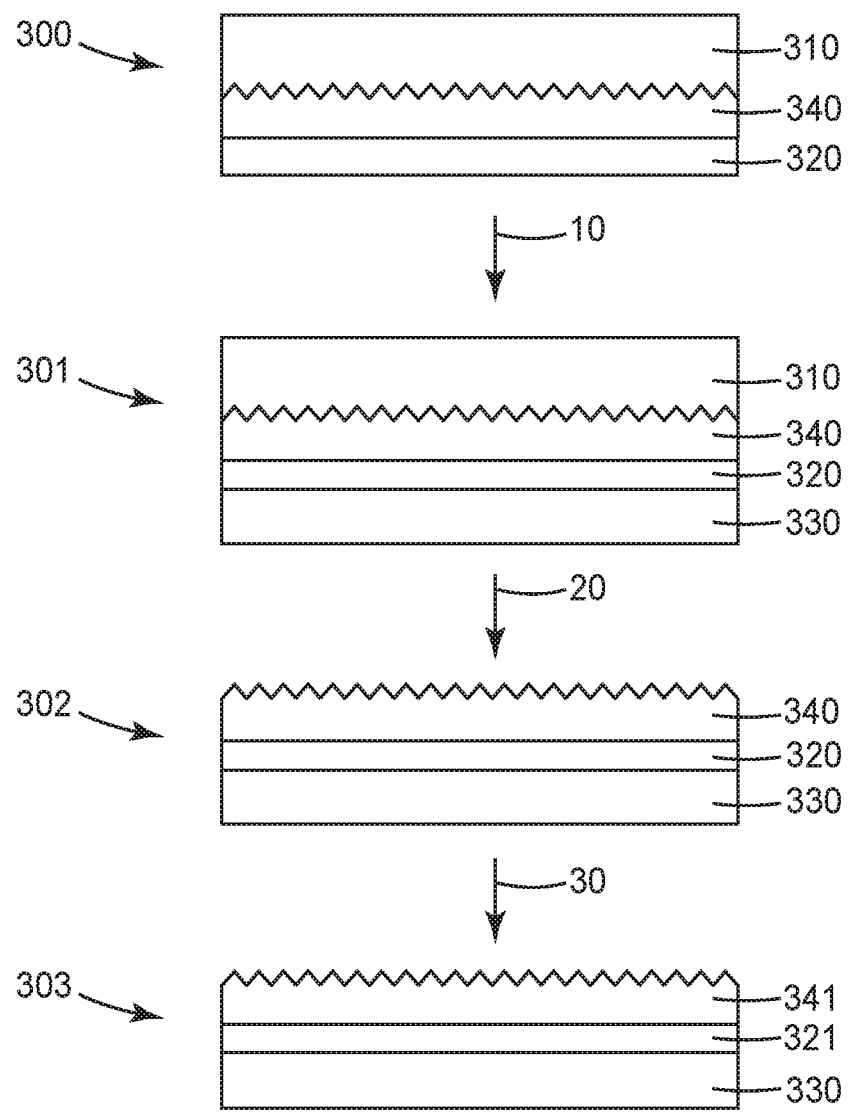
FIG. 3 is a cross sectional view of another embodiment of a process for preparing and using the adhesive layers, transfer tapes, and multilayer articles of the present disclosure.

FIG. 3 describes a similar process as FIG. 1. In FIG. 3, article 300, which is a transfer tape, comprises adhesive layer 320, backfill layer 340, and release substrate 310. In this embodiment, the surface of backfill layer 340 that is in contact with the release substrate 310 comprises a microstructured surface. In step 10, transfer tape 300 is contacted to receptor substrate 330 to form multilayer article 301. In step 20, release substrate 310 is removed to generate article 302 which comprises receptor substrate 330 in contact with adhesive layer 320, which is in contact with backfill layer 340 which has an exposed microstructured surface. In step 30, article 302 is baked-out as described above to generate article 303 which comprises receptor substrate 330 and ceramic-like layer 321 generated from adhesive layer 320, and cure backfill layer 341, wherein cured backfill layer 341 has an exposed microstructured surface.

Figure 4:
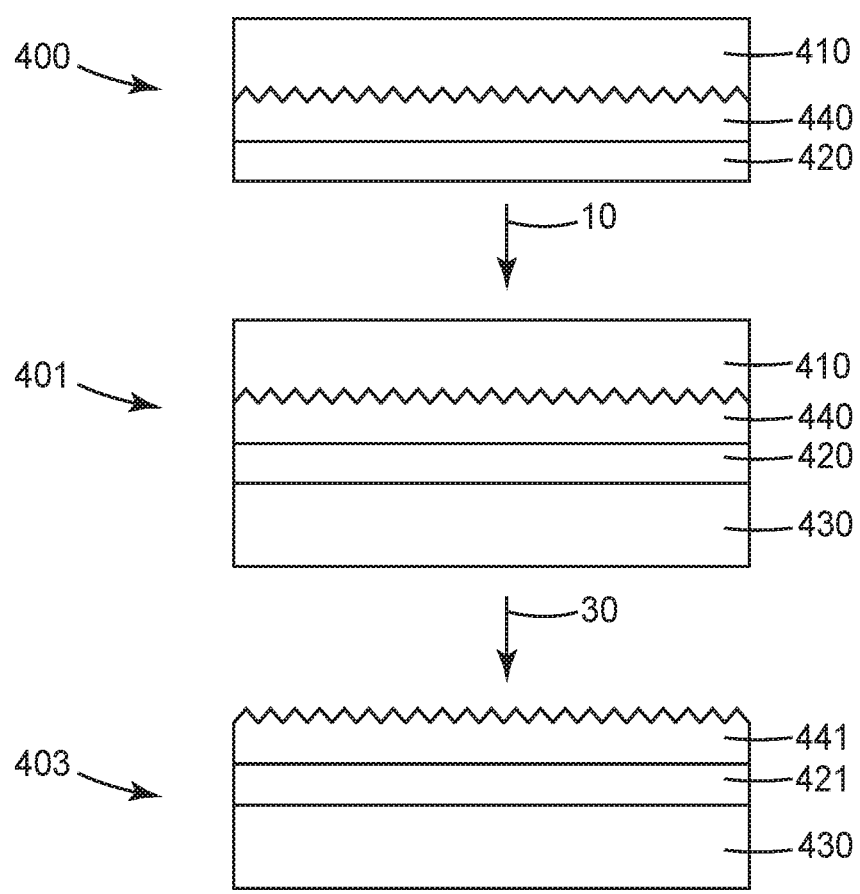
FIG. 4 is a cross sectional view of another embodiment of a process for preparing and using the adhesive layers, transfer tapes, and multilayer articles of the present disclosure.

FIG. 4 describes a process which utilizes a sacrificial layer. In FIG. 4, article 400, which is a transfer tape, comprises adhesive layer 420, release substrate 410, and backfill layer 440 between adhesive layer 420 and sacrificial release substrate 410. In this embodiment, the surface of backfill layer 440 that is in contact with the sacrificial release substrate 410 comprises a microstructured surface. In step 10, transfer tape 400 is contacted to receptor substrate 430 to form multilayer article 401. In step 30, article 401 is baked-out as described above to generate article 403 which comprises receptor substrate 430 and ceramic-like layer 421 generated from adhesive layer 420, and cured backfill layer 441 generated from backfill layer 440, wherein cured backfill layer 441 has an exposed microstructured surface. Sacrificial release substrate 410 has been removed by the bake-out step.

Figure 5:
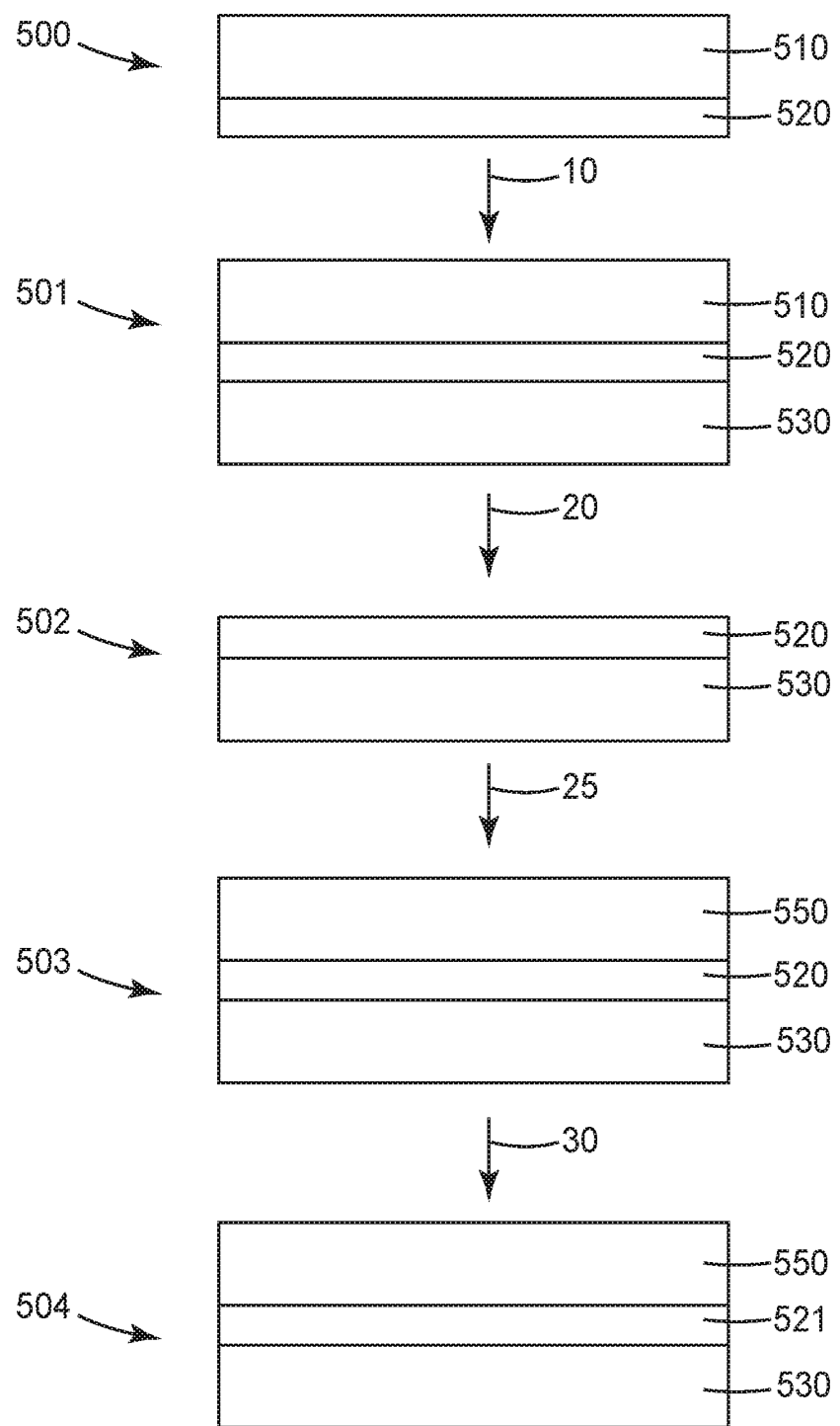
FIG. 5 is a cross sectional view of another embodiment of a process for preparing and using the adhesive layers, transfer tapes, and multilayer articles of the present disclosure.

In FIG. 5, article 500, which is a transfer tape, comprises adhesive layer 520 and release substrate 510. In step 10, transfer tape 500 is contacted to receptor substrate 530 to form multilayer article 501. In step 20, release substrate 510 is removed to generate article 502 which comprises receptor substrate 530 in contact with adhesive layer 520. In step 25, second receptor substrate 550 is contacted to adhesive layer 520 to generate article 503. In step 30, article 503 is baked-out as described above to generate article 504 which comprises receptor substrate 530, ceramic-like layer 521 generated from adhesive layer 520, and second receptor substrate 550.

Figure 6:
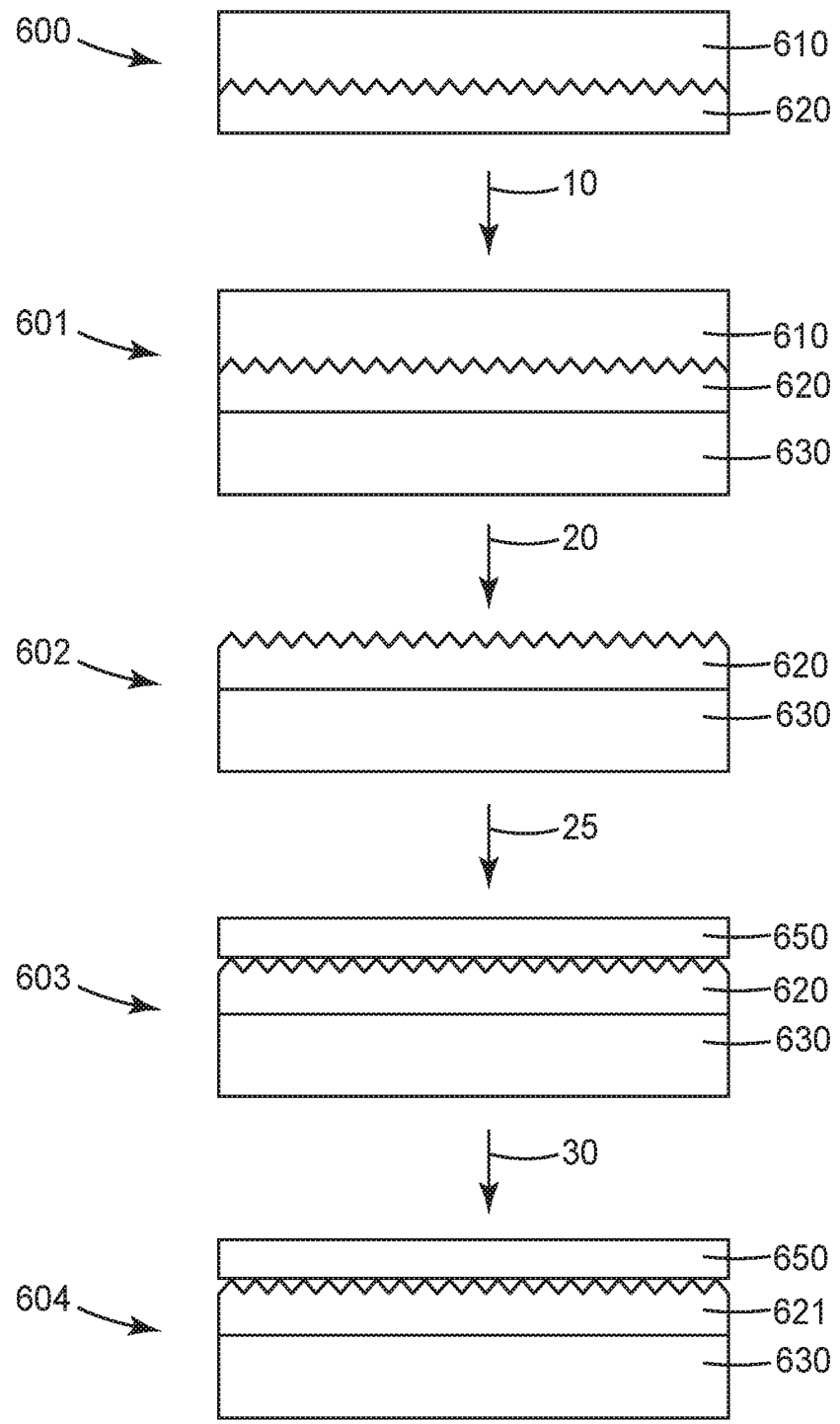
FIG. 6 is a cross sectional view of another embodiment of a process for preparing and using the adhesive layers, transfer tapes, and multilayer articles of the present disclosure.

In FIG. 6, article 600, which is a transfer tape, comprises adhesive layer 620 and release substrate 610. In this embodiment, the surface of adhesive layer 620 that is in contact with the release substrate 610 comprises a microstructured surface. In step 10, transfer tape 600 is contacted to receptor substrate 630 to form multilayer article 601. In step 20, release substrate 610 is removed to generate article 602 which comprises receptor substrate 630 in contact with adhesive layer 620, which has an exposed microstructured surface. In step 25, second receptor substrate 650 is contacted to adhesive layer 620 to generate article 603. In step 30, article 603 is baked-out as described above to generate article 604 which comprises receptor substrate 630, ceramic-like layer 621 generated from adhesive layer 620, and second receptor substrate 650, and wherein ceramic-like layer 621 has at least partially retained a microstructured surface.

Figure 7:
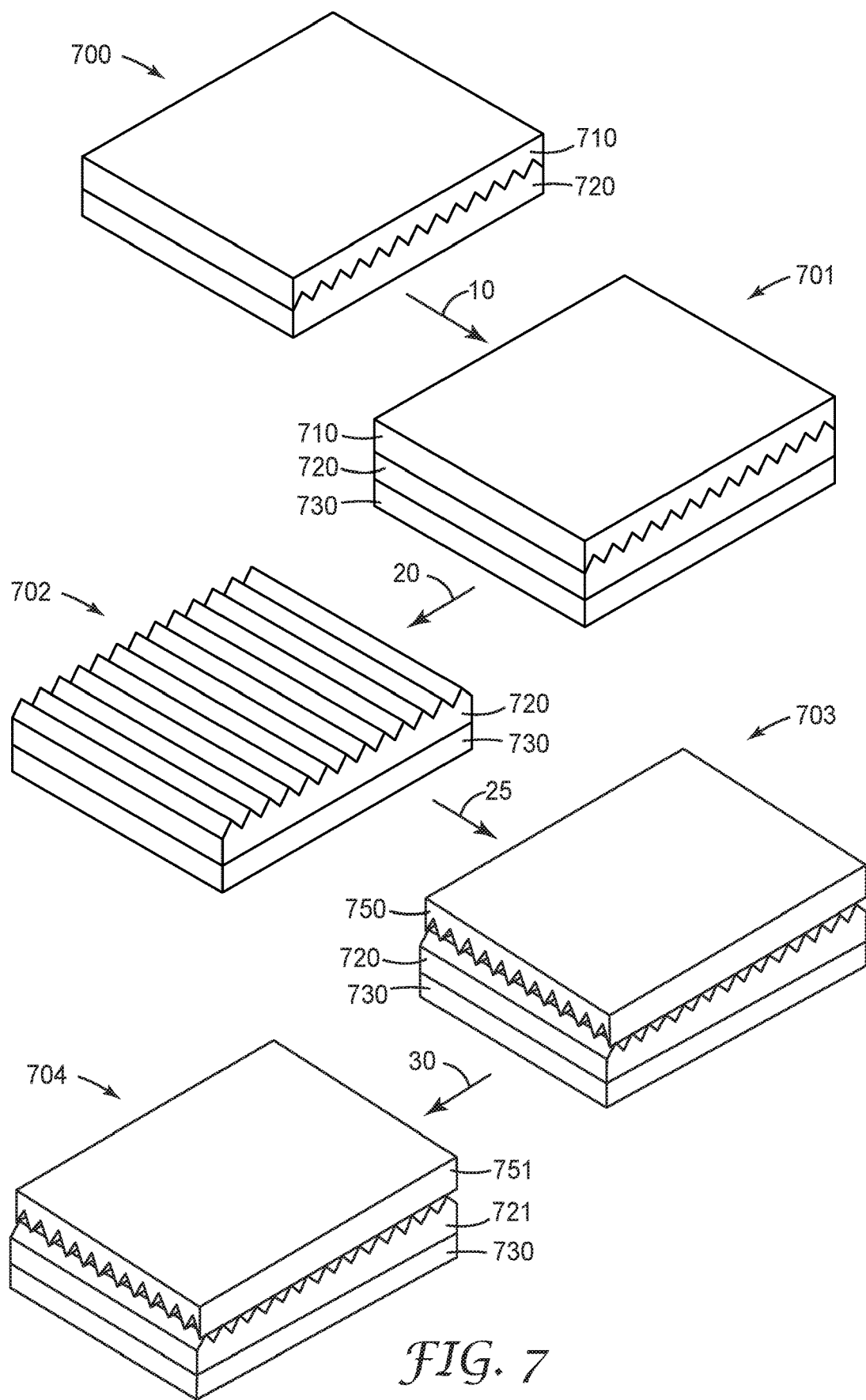
FIG. 7 is a cross sectional view of another embodiment of a process for preparing and using the adhesive layers, transfer tapes, and multilayer articles of the present disclosure.

In FIG. 7, article 700, which is a transfer tape, comprises adhesive layer 720 and release substrate 710. In this embodiment, the surface of adhesive layer 720 that is in contact with the release substrate 710 comprises a microstructured surface. In step 10, transfer tape 700 is contacted to receptor substrate 730 to form multilayer article 701. In step 20, release substrate 710 is removed to generate article 702 which comprises receptor substrate 730 in contact with adhesive layer 720, which has an exposed microstructured surface. In step 25, second adhesive layer 750 is contacted to adhesive layer 720 to generate article 703. Second adhesive layer 750 may be the same composition as adhesive layer 720, or it may be different. Second adhesive layer 750 may also be a pressure sensitive adhesive layer, or not, as long as second adhesive layer 750 bakes-out under the same conditions as adhesive layer 720. In this embodiment, the surface of second adhesive layer 750 comprises a microstructured surface. The microstructured surfaces of adhesive layer 720 and second adhesive layer 750 comprise the same patterned array of structural elements. Second adhesive layer 750 is contacted to the microstructured surface of adhesive layer 720 in such a way that the pattered arrays of structural elements are substantially non-parallel (in this figure orthogonal) to each other. In step 30, article 703 is baked-out as described above to generate article 704 which comprises receptor substrate 730, ceramic-like layer 721 generated from adhesive layer 720, and second ceramic-like layer 751 generated from second adhesive layer 750. Ceramic-like layers 721 and 751 have at least partially retained a microstructured surface.

Figure 8:
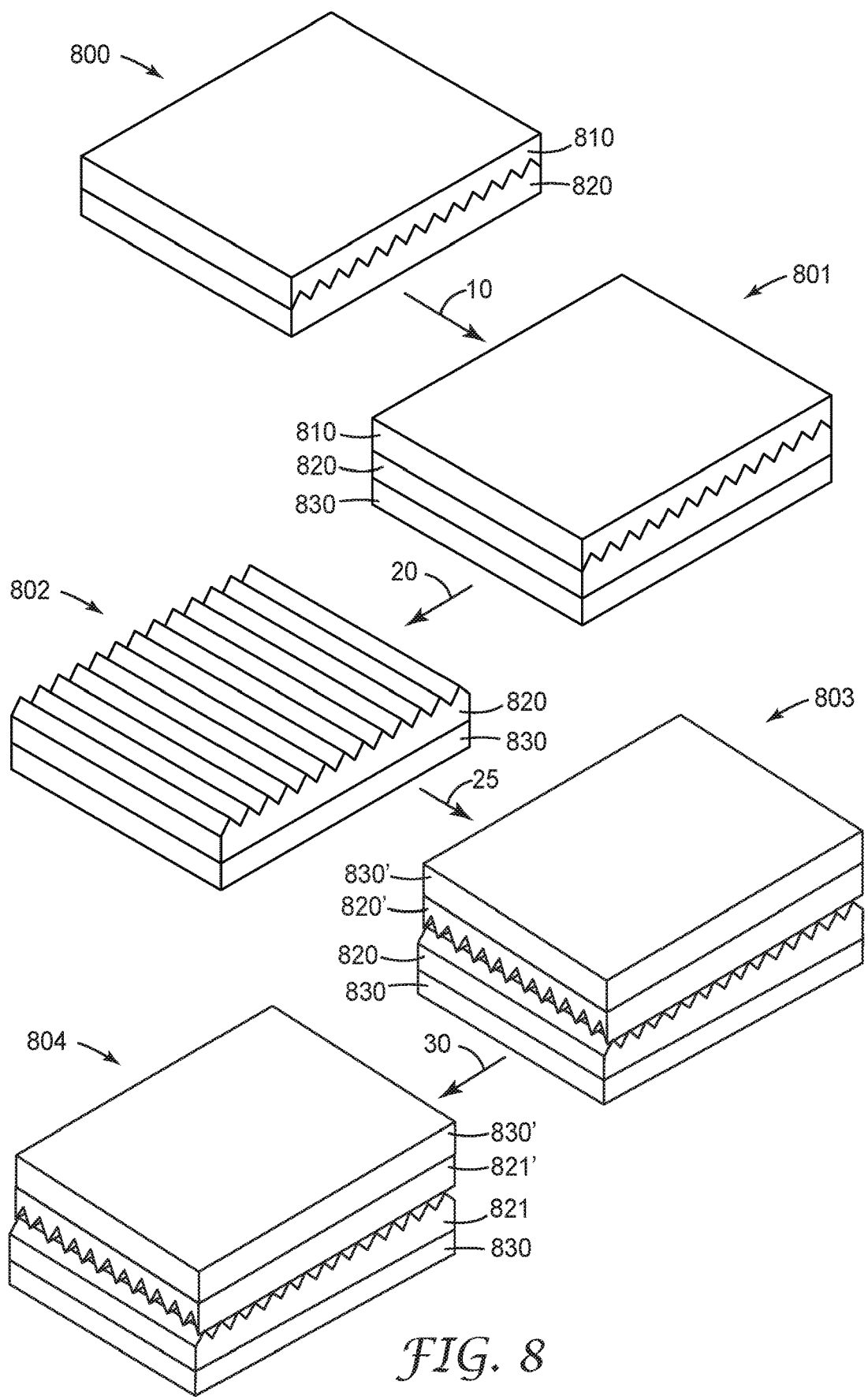
FIG. 8 is a cross sectional view of another embodiment of a process for preparing and using the adhesive layers, transfer tapes, and multilayer articles of the present disclosure.

In FIG. 8, article 800, which is a transfer tape, comprises adhesive layer 820 and release substrate 810. In this embodiment, the surface of adhesive layer 820 that is in contact with the release substrate 810 comprises a microstructured surface. In step 10, transfer tape 800 is contacted to receptor substrate 830 to form multilayer article 801. In step 20, release substrate 810 is removed to generate article 802 which comprises receptor substrate 830 in contact with adhesive layer 820, which has an exposed microstructured surface. In step 25, a second adhesive article is contacted to adhesive layer 820 to generate article 803. The second adhesive article is similar or the same as article 802 with receptor substrate 830' and adhesive layer 820'. Adhesive layer 820' may be the same composition as adhesive layer 820, or it may be different, as long as second adhesive layer 820' bakes-out under the same conditions as adhesive layer 820. In this embodiment, the surface of second adhesive layer 820' comprises a microstructured surface. The microstructured surfaces of adhesive layer 820 and second adhesive layer 820' comprise the same patterned array of structural elements. Second adhesive layer 820' is contacted to the microstructured surface of adhesive layer 820 in such a way that the pattered arrays of structural elements are substantially non-parallel (in this figure orthogonal) to each other, or at least the microstructures are not aligned. In step 30, article 803 is baked-out as described above to generate article 804 which comprises receptor substrate 830, ceramic-like layer 821 generated from adhesive layer 820, second ceramic-like layer 821' generated from second adhesive layer 820', and receptor substrate 830'. Ceramic-like layers 821 and 821' have at least partially retained a microstructured surface.

This disclosure includes the following embodiments:

Among the embodiments are adhesive layers. Embodiment 1 includes an adhesive layer comprising: a cured copolymer prepared from a reaction mixture comprising: at least one alkyl (meth)acrylate; at least one ethylenically unsaturated silane; and an initiator; wherein the adhesive layer is a pressure sensitive adhesive at room temperature and is convertible into a ceramic-like layer by bake-out at a temperature of from 170-500° C.

Embodiment 2 is the adhesive layer of embodiment 1, wherein the bake-out temperature is from 250-500° C.

Embodiment 3 is the adhesive layer of embodiment 1, wherein the bake-out temperature is from 300-500° C.

Embodiment 4 is the adhesive layer of any of embodiments 1-3, wherein the bake-out is carried out for a time of at least 10 minutes.

Embodiment 5 is the adhesive layer of embodiment 1, wherein the bake-out is carried out at a temperature is from 300° C. for a time of at least one hour.

Embodiment 6 is the adhesive layer of embodiment 1, wherein the bake-out is carried out at a temperature is from 400° C. for a time of at least one hour.

Embodiment 7 is the adhesive layer of embodiment 1, wherein the at least one alkyl (meth)acrylate comprises an alkyl group with 4-20 carbon atoms.

Embodiment 8 is the adhesive layer of any of embodiments 1-7, wherein the at least one alkyl (meth)acrylate comprises an alkyl group with 4-20 carbon atoms comprises at least one of isooctyl acrylate, 2-etyl-hexyl acrylate, n-butyl acrylate.

Embodiment 9 is the adhesive layer of any of embodiments 1-8, wherein the reaction mixture further comprises: at least one copolymerizable ethylenically unsaturated compound that is free of acidic or basic groups.

Embodiment 10 is the adhesive layer of embodiment 9, wherein the at least one copolymerizable ethylenically unsaturated compound that is free of acidic or basic groups comprises an alkyl (meth)acrylate monomer, a vinyl monomer, or a reinforcing monomer.

Embodiment 11 is the adhesive layer of embodiment 9 or 10, wherein the at least one copolymerizable ethylenically unsaturated compound that is free of acidic or basic groups comprises a hydroxyl functional (meth)acrylate.

Embodiment 12 is the adhesive layer of any of embodiments 9-11, wherein the at least one copolymerizable ethylenically unsaturated compound that is free of acidic or basic groups is present in amount of 0.1-30 weight %, based upon the total weight of monomers.

Embodiment 13 is the adhesive layer of any of embodiments 1-12, wherein the at least one ethylenically unsaturated silane is of by the general formula: $X-L_1-SiY^1Y^2Y^3$ wherein X comprises a (meth)acrylate group; $L_1$ is a single covalent bond or a divalent linking group; and each of $Y^1$, $Y^2$, and $Y^3$ is independently a hydrolysable group or an alkyl group, such that at least one of $Y^1$, $Y^2$, and $Y^3$ is a hydrolysable group.

Embodiment 14 is the adhesive layer of embodiment 13, wherein the at least one hydrolysable group is an alkoxy group or an acetoxy group.

Embodiment 15 is the adhesive layer of any of embodiments 1-14, wherein the at least one ethylenically unsaturated silane is present in amount of 0.1-30 weight %, based upon the total weight of monomers.

Embodiment 16 is the adhesive layer of any of embodiments 1-15, further comprising at least one additive selected from plasticizers, tackifiers, microparticle fillers, nanoparticle fillers, metal oxide fillers, bead fillers, glass bubbles, chopped fibers, antioxidants, viscosity control additives, refractive index modifying agents, or combinations thereof.

Embodiment 17 is the adhesive layer of embodiment 16, wherein the at least one additive comprises a siloxane tackifier resin.

Embodiment 18 is the adhesive layer of any of embodiments 1-17, wherein the initiator comprises a thermal initiator.

Embodiment 19 is the adhesive layer of any of embodiments 1-18, further comprising a crosslinking agent.

Embodiment 20 is the adhesive layer of any of embodiments 1-19, wherein the adhesive layer is optically transmissive.

Embodiment 21 is the adhesive layer of any of embodiments 1-19, wherein the adhesive layer is optically clear.

Embodiment 22 is the adhesive layer of any of embodiments 1-21, wherein the adhesive layer comprises a structured surface.

Among the embodiments are transfer tapes. Embodiment 23 includes a transfer tape comprising: a release substrate with a first major surface and a second major surface; and an adhesive layer adjacent to at least a portion of the second major surface of the release substrate, the adhesive layer comprising: a cured copolymer prepared from a reaction mixture comprising: at least one alkyl (meth)acrylate; at least one ethylenically unsaturated silane; and an initiator; wherein the adhesive layer is a pressure sensitive adhesive at room temperature and is convertible into a ceramic-like layer by bake-out at a temperature of from 170-500° C.

Embodiment 24 is the transfer tape of embodiment 23, wherein the bake-out temperature is from 250-500° C.

Embodiment 25 is the transfer tape of embodiment 23, wherein the bake-out temperature is from 300-500° C.

Embodiment 26 is the transfer tape of any of embodiments 23-25, wherein the bake-out is carried out for a time of at least 10 minutes.

Embodiment 27 is the transfer tape of embodiment 23, wherein the bake-out is carried out at a temperature is from 300° C. for a time of at least one hour.

Embodiment 28 is the transfer tape of embodiment 23, wherein the bake-out is carried out at a temperature is from 400° C. for a time of at least one hour.

Embodiment 29 is the transfer tape of any of embodiments 23-28, wherein the at least one alkyl (meth)acrylate comprises an alkyl group with 4-20 carbon atoms.

Embodiment 30 is the transfer tape of embodiment 29, wherein the at least one alkyl (meth)acrylate comprises an alkyl group with 4-20 carbon atoms comprises at least one of isooctyl acrylate, 2-etyl-hexyl acrylate, n-butyl acrylate.

Embodiment 31 is the transfer tape of any of embodiments 23-30, wherein the reaction mixture further comprises: at least one copolymerizable ethylenically unsaturated compound that is free of acidic or basic groups.

Embodiment 32 is the transfer tape of embodiment 31, wherein the at least one copolymerizable ethylenically unsaturated compound that is free of acidic or basic groups comprises an alkyl (meth)acrylate monomer, a vinyl monomer, or a reinforcing monomer.

Embodiment 33 is the transfer tape of embodiment 31 or 32, wherein the at least one copolymerizable ethylenically unsaturated compound that is free of acidic or basic groups comprises a hydroxyl functional (meth)acrylate.

Embodiment 34 is the transfer tape of any of embodiments 31-33, wherein the at least one copolymerizable ethylenically unsaturated compound that is free of acidic or basic groups is present in amount of 0.1-30 weight %, based upon the total weight of monomers.

Embodiment 35 is the transfer tape of any of embodiments 23-34, wherein the at least one ethylenically unsaturated silane is of by the general formula: $X-L_1-SiY^1Y^2Y^3$ wherein X comprises a (meth)acrylate group; $L_1$ is a single covalent bond or a divalent linking group; and each of $Y^1$, $Y^2$, and $Y^3$ is independently a hydrolysable group or an alkyl group, such that at least one of $Y^1$, $Y^2$, and $Y^3$ is a hydrolysable group.

Embodiment 36 is the transfer tape of embodiment 35, wherein the at least one hydrolysable group is an alkoxy group or an acetoxy group.

Embodiment 37 is the transfer tape of any of embodiments 23-36, wherein the at least one ethylenically unsaturated silane is present in amount of 0.1-30 weight %, based upon the total weight of monomers.

Embodiment 38 is the transfer tape of any of embodiments 23-37, further comprising at least one additive selected from plasticizers, tackifiers, microparticle fillers, nanoparticle fillers, metal oxide fillers, bead fillers, glass bubbles, chopped fibers, antioxidants, viscosity control additives, refractive index modifying agents, or combinations thereof.

Embodiment 39 is the transfer tape of embodiment 38, wherein the at least one additive comprises a siloxane tackifier resin.

Embodiment 40 is the transfer tape of any of embodiments 23-39, wherein the initiator comprises a thermal initiator.

Embodiment 41 is the transfer tape of any of embodiments 23-40, further comprising a crosslinking agent.

Embodiment 42 is the transfer tape of any of embodiments 23-41, wherein the adhesive layer is optically transmissive.

Embodiment 43 is the transfer tape of any of embodiments 23-41, wherein the adhesive layer is optically clear.

Embodiment 44 is the transfer tape of any of embodiments 23-43, wherein the adhesive layer comprises a structured surface.

Embodiment 45 is the transfer tape of any of embodiments 23-44, wherein the adhesive layer is in contact with the second major surface of the release substrate.

Embodiment 46 is the transfer tape of any of embodiments 23-45, further comprising a backfill layer wherein the backfill layer is intermediate between the adhesive layer and the second major surface of the release substrate.

Embodiment 47 is the transfer tape of any of embodiments 23-45, further comprising a backfill layer and a sacrificial layer, wherein the backfill layer is in contact with the adhesive layer, and the sacrificial layer is in contact with the backfill layer, and wherein the sacrificial layer comprises a release layer or a template layer and wherein the sacrificial layer is removed prior to or during bake-out.

Among the embodiments are multilayer articles. Embodiment 48 includes a multilayer article comprising: a receptor substrate comprising a first major surface and a second major surface; and a ceramic-like layer in contact with the second major surface of the receptor substrate, the ceramic-like layer comprising a baked-out pressure sensitive adhesive layer, wherein the pressure sensitive adhesive is baked-out at a temperature of from 170-500° C., the pressure sensitive adhesive layer comprising: a cured copolymer prepared from a reaction mixture comprising: at least one alkyl (meth)acrylate; at least one ethylenically unsaturated silane; and an initiator.

Embodiment 49 is the multilayer article of embodiment 48, wherein the bake-out temperature is from 250-500° C.

Embodiment 50 is the multilayer article of embodiment 48, wherein the bake-out temperature is from 300-500° C.

Embodiment 51 is the multilayer article of any of embodiments 48-50, wherein the bake-out is carried out for a time of at least 10 minutes.

Embodiment 52 is the multilayer article of embodiment 48, wherein the bake-out is carried out at a temperature is from 300° C. for a time of at least one hour.

Embodiment 53 is the multilayer article of embodiment 48, wherein the bake-out is carried out at a temperature is from 400° C. for a time of at least one hour.

Embodiment 54 is the multilayer article of embodiment 48, wherein the at least one alkyl (meth)acrylate comprises an alkyl group with 4-20 carbon atoms.

Embodiment 55 is the multilayer article of any of embodiments 48-54, wherein the at least one alkyl (meth)acrylate comprises an alkyl group with 4-20 carbon atoms comprises at least one of isooctyl acrylate, 2-etyl-hexyl acrylate, n-butyl acrylate.

Embodiment 56 is the multilayer article of any of embodiments 48-55, wherein the reaction mixture further comprises: at least one copolymerizable ethylenically unsaturated compound that is free of acidic or basic groups.

Embodiment 57 is the multilayer article of embodiment 56, wherein the at least one copolymerizable ethylenically unsaturated compound that is free of acidic or basic groups comprises an alkyl (meth)acrylate monomer, a vinyl monomer, or a reinforcing monomer.

Embodiment 58 is the multilayer article of embodiment 56 or 57, wherein the at least one copolymerizable ethylenically unsaturated compound that is free of acidic or basic groups comprises a hydroxyl functional (meth)acrylate.

Embodiment 59 is the multilayer article of any of embodiments 56-58, wherein the at least one copolymerizable ethylenically unsaturated compound that is free of acidic or basic groups is present in amount of 0.1-30 weight %, based upon the total weight of monomers.

Embodiment 60 is the multilayer article of any of embodiments 48-59, wherein the at least one ethylenically unsaturated silane is of by the general formula: $X-L_1-SiY^1Y^2Y^3$ wherein X comprises a (meth)acrylate group; $L_1$ is a single covalent bond or a divalent linking group; and each of $Y^1$, $Y^2$, and $Y^3$ is independently a hydrolysable group or an alkyl group, such that at least one of $Y^1$, $Y^2$, and $Y^3$ is a hydrolysable group.

Embodiment 61 is the multilayer article of embodiment 60, wherein the at least one hydrolysable group is an alkoxy group or an acetoxy group.

Embodiment 62 is the multilayer article of any of embodiments 48-61, wherein the at least one ethylenically unsaturated silane is present in amount of 0.1-30 weight %, based upon the total weight of monomers.

Embodiment 63 is the multilayer article of any of embodiments 48-62, wherein the pressure sensitive adhesive layer further comprises at least one additive selected from plasticizers, tackifiers, microparticle fillers, nanoparticle fillers, metal oxide fillers, bead fillers, glass bubbles, chopped fibers, antioxidants, viscosity control additives, refractive index modifying agents, or combinations thereof.

Embodiment 64 is the multilayer article of embodiment 63, wherein the at least one additive comprises a siloxane tackifier resin.

Embodiment 65 is the multilayer article of any of embodiments 48-64, wherein the initiator comprises a thermal initiator.

Embodiment 66 is the multilayer article of any of embodiments 48-65, wherein the reaction mixture further comprises a crosslinking agent.

Embodiment 67 is the multilayer article of any of embodiments 48-66, wherein the pressure sensitive adhesive layer is optically transmissive.

Embodiment 68 is the multilayer article of any of embodiments 48-66, wherein the pressure sensitive adhesive layer is optically clear.

Embodiment 69 is the multilayer article of any of embodiments 48-68, wherein the pressure sensitive adhesive layer comprises a structured surface.

Embodiment 70 is the multilayer article of any of embodiments 48-69, wherein the ceramic-like layer is optically transmissive.

Embodiment 71 is the multilayer article of any of embodiments 48-69, wherein the ceramic-like layer is optically clear.

Embodiment 72 is the multilayer article of any of embodiments 48-71, further comprising a cured backfill layer in contact with the ceramic-like layer, the cured layer comprising a curable backfill layer cured during bake-out.

Embodiment 73 is the multilayer article of any of embodiments 48-72, wherein the receptor substrate comprises glass, metal, sapphire, silicon, silica, silicon carbide, silicon nitride, and semiconductor materials on a support wafer.

Embodiment 74 is the multilayer article of any of embodiments 48-73, further comprising a second receptor substrate with a first major surface and a second major surface, wherein the ceramic-like layer is in contact with the first major surface of the second receptor substrate.

Embodiment 75 is the multilayer article of embodiment 74, wherein the second receptor substrate is the same as the first receptor substrate.

Embodiment 76 is the multilayer article of embodiment 74, wherein the second receptor substrate is different from the first receptor substrate.

Among the embodiments are methods of preparing an article. Embodiment 77 includes a method of preparing an article comprising: providing a receptor substrate with a first major surface and a second major surface; providing a transfer tape, the transfer tape comprising: a release substrate with a first major surface and a second major surface; and a pressure sensitive adhesive layer adjacent to at least a portion of the second major surface of the release substrate, the pressure sensitive adhesive layer comprising: a cured copolymer prepared from a reaction mixture comprising: at least one alkyl (meth)acrylate; at least one ethylenically unsaturated silane; and an initiator; applying the transfer tape to the receptor substrate such that the pressure sensitive adhesive layer is in contact with the second major surface of the receptor substrate; removing the releasing substrate from the transfer tape in contact with the second major surface of the receptor substrate to form a pressure sensitive adhesive layer laminated to the second major surface of the receptor substrate; and baking-out the pressure sensitive adhesive layer laminated to the second major surface of the receptor substrate at a temperature from 170-500° C., to form a ceramic-like layer on the second major surface of the receptor substrate.

Embodiment 78 is the method of embodiment 77, wherein the bake-out temperature is from 250-500° C.

Embodiment 79 is the method of embodiment 77, wherein the bake-out temperature is from 300-500° C.

Embodiment 80 is the method of any of embodiments 77-79, wherein the bake-out is carried out for a time of at least 10 minutes.

Embodiment 81 is the method of embodiment 77, wherein the bake-out is carried out at a temperature is from 300° C. for a time of at least one hour.

Embodiment 82 is the method of embodiment 77, wherein the bake-out is carried out at a temperature is from 400° C. for a time of at least one hour.

Embodiment 83 is the method of any of embodiments 77-82, wherein the at least one alkyl (meth)acrylate comprises an alkyl group with 4-20 carbon atoms.

Embodiment 84 is the method of any of embodiments 77-83, wherein the at least one alkyl (meth)acrylate comprises an alkyl group with 4-20 carbon atoms comprises at least one of isooctyl acrylate, 2-etyl-hexyl acrylate, n-butyl acrylate.

Embodiment 85 is the method of any of embodiments 77-84, wherein the reaction mixture further comprises: at least one copolymerizable ethylenically unsaturated compound that is free of acidic or basic groups.

Embodiment 86 is the method of embodiment 85, wherein the at least one copolymerizable ethylenically unsaturated compound that is free of acidic or basic groups comprises an alkyl (meth)acrylate monomer, a vinyl monomer, or a reinforcing monomer.

Embodiment 87 is the method of embodiment 85 or 86, wherein the at least one copolymerizable ethylenically unsaturated compound that is free of acidic or basic groups comprises a hydroxyl functional (meth)acrylate.

Embodiment 88 is the method of any of embodiments 85-87, wherein the at least one copolymerizable ethylenically unsaturated compound that is free of acidic or basic groups is present in amount of 0.1-30 weight %, based upon the total weight of monomers.

Embodiment 89 is the method of any of embodiments 77-88, wherein the at least one ethylenically unsaturated silane is of by the general formula: $X-L_1-SiY^1Y^2Y^3$ wherein X comprises a (meth)acrylate group; Li is a single covalent bond or a divalent linking group; and each of $Y^1$, $Y^2$, and $Y^3$ is independently a hydrolysable group or an alkyl group, such that at least one of $Y^1$, $Y^2$, and $Y^3$ is a hydrolysable group.

Embodiment 90 is the method of embodiment 89, wherein the at least one hydrolysable group is an alkoxy group or an acetoxy group.

Embodiment 91 is the method of any of embodiments 89 or 90, wherein the at least one ethylenically unsaturated silane is present in amount of 0.1-30 weight %, based upon the total weight of monomers.

Embodiment 92 is the method of any of embodiments 77-91, wherein the pressure sensitive adhesive layer further comprises at least one additive selected from plasticizers, tackifiers, microparticle fillers, nanoparticle fillers, metal oxide fillers, bead fillers, glass bubbles, chopped fibers, antioxidants, viscosity control additives, refractive index modifying agents, or combinations thereof.

Embodiment 93 is the method of embodiment 92, wherein the at least one additive comprises a siloxane tackifier resin.

Embodiment 94 is the method of any of embodiments 77-93, wherein the initiator comprises a thermal initiator.

Embodiment 95 is the method of any of embodiments 77-94, wherein the reaction mixture further comprises a crosslinking agent.

Embodiment 96 is the method of any of embodiments 77-95, wherein the pressure sensitive adhesive layer is optically transmissive.

Embodiment 97 is the method of any of embodiments 77-95, wherein the pressure sensitive adhesive layer is optically clear.

Embodiment 98 is the method of any of embodiments 77-97, wherein the pressure sensitive adhesive layer comprises a structured surface.

Embodiment 99 is the method of any of embodiments 77-98, wherein the ceramic-like layer is optically transmissive.

Embodiment 100 is the method of any of embodiments 77-98, wherein the ceramic-like layer is optically clear.

Embodiment 101 is the method of any of embodiments 77-100, further comprising applying a backfill layer to the surface of the pressure sensitive adhesive layer laminated to the second major surface of the receptor substrate prior to baking-out the pressure sensitive adhesive layer laminated to the second major surface of the receptor substrate, such that the backfill layer cures during the bake-out and adheres to the receptor substrate via the ceramic-like layer formed from the adhesive layer.

Embodiment 102 is the method of any of embodiments 77-100, wherein providing a transfer tape comprises providing a transfer tape comprising: a releasing substrate; a backfill layer in contact with the releasing substrate; and a pressure sensitive adhesive layer in contact with the backfill layer.

Embodiment 103 is the method of any of embodiments 77-100, further comprising: providing a second receptor substrate with a first major surface and a second major surface; and contacting the first major surface of the second receptor substrate to the pressure sensitive adhesive layer.

Embodiment 104 is the method of any of embodiments 77-100, further comprising: prior to baking-out, providing a second receptor substrate with a first major surface and a second major surface, and a second adhesive layer in contact with the first major surface of the second receptor substrate, wherein the second adhesive layer can be the same or different from the first adhesive layer, and bakes out at the same or a lower temperature than the first adhesive layer; contacting the second adhesive layer to the surface of the first adhesive layer.

Embodiment 105 is the method of embodiment 104, further comprising a backfill layer located between the first adhesive layer and the second adhesive layer.

Embodiment 106 is the method of any of embodiments 77-105, wherein removing the release substrate comprises peeling off the release substrate.

Embodiment 107 is the method of any of embodiments 77-105, wherein the release substrate comprises a release layer and a backing layer and removing the release substrate comprises peeling off the backing layer and leaving the release layer as a sacrificial layer.

Embodiment 108 is the method of any of embodiments 77-107, wherein the receptor substrate comprises glass, metal, sapphire, silicon, silica, silicon carbide, silicon nitride, and semiconductor materials on a support wafer.

Embodiment 109 is the method of any of embodiments 103-108, wherein the second receptor substrate is the same as the first receptor substrate.

Embodiment 110 is the method of any of embodiments 103-108, wherein the second receptor substrate is different from the first receptor substrate.

EXAMPLES

Polymeric adhesives as ceramic-like precursors were prepared. The materials were applied to substrates and the optical, adhesive and decomposition properties were evaluated as shown in the following examples. These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company, St. Louis, Missouri unless otherwise noted. Abbreviations are used herein according to their common usage in the art. Among the Abbreviations used are: g=grams; mm=millimeters; cm=centimeters; in=inches; ft=feet; m=meters; nm=nanometers; rpm=revolutions per minute; min=minutes; sec=seconds; W=Watts; cc=cubic centimeters; mL=milliliters; psi=pounds per square inch.

Materials List

| Abbreviation | Source |
|---|---|
| M1 | Monomer, Iso-octyl acrylate commercially available from 3M Company, St. Paul, MN, as 3M Monomer IOA DS-2051. |
| M2 | Monomer, 3-(trimethoxysilyl) propyl methacrylate (TMSiMA) acrylate commercially available from Gelest Inc., Morrisville, PA, as SIM6487.4. |
| I1 | Initiator, 2,2'-Azobis(2-methylbutyronitrile) commercially available from Sigma Aldrich, St. Louis, MO, as VAZO 67. |
| I2 | Initiator, 4-acryloxybenzophenone commercially available from Sigma Aldrich, St. Louis, MO. |
| M3 | Monomer, 2-hydroxyethylmethacrylate (HEMA) commercially available from Sigma Aldrich, St. Louis, MO. |
| R1 | Resin, silica-filled methylpolysiloxane polymer commercially available from California Hardcoating Company, Chula Vista, CA, as PERMA-NEW 6000. |
| M4 | Monomer, Methyltriethoxysilane (MTES) commercially available from Gelest Inc., Morrisville, PA, as SIM6555.0. |
| R2 | Resin, dipentaerythritol pentaacrylate commercially available from Sartomer Americas Exton, PA, as SR399. |
| R3 | 1,6-hexanediol diacrylate commercially available from Sartomer Americas, Exton, PA, as SR238. |
| I4 | Initiator, commercially available from BASF Corp., Wyandotte, MI, as IRGACURE TPO. |
| I3 | Initiator commercially available from BASF Corp., Florham Park, NJ, as IRGACURE 1173. |
| S1 | Surfactant, triethanolamine commercially available from Sigma Aldrich, St. Louis, MO. |
| ADH1 | Pressure-sensitive adhesive solution prepared by diluting a 90:10 (w/w) isooctyl acrylate:acrylic acid copolymer (monomers available from Sigma Aldrich; copolymer prepared using methods described in U.S. Pat. No. 4,737,577 Example 5) to 5 wt % solids in 1:1 (w/w) isopropanol. |
| I5 | Initiator, p-(OCTYLOXYPHENYL)PHENYLIODONIUM HEXAFLUOROANTIMONATE commercially available from Gelest Inc., Morrisville, PA, as OMAN071. |
| R4 | Ethoxylated (4) bisphenol A dimethacrylate commercially available from Sartomer Americas Exton, PA, as SR540. |
| C1 | PMMA copolymer, 75 wt. % polymethylmethacrylate, 25 wt. % polyethyl acrylate, commercially available from Altuglas Inc., PRD510-A. |
| IPA | Iso-propyl alcohol |
| PET Film | Polyester film of 51 micrometer (2 mil) thick polyethylene terephthalate, commercially available as MELINEX 454 from Teijin DuPont Films, Chester, VA |
| PTFE | polytetrafluoroethylene |

Ceramifiable Adhesive Polymer Preparations

Examples 1-4

Ceramifiable Adhesive Polymer solutions were prepared using the formulations in Table 1 by the following procedure: The formulation components were mixed together in a glass bottle. The bottle was degassed with nitrogen, sealed, and heated in a water bath at 65° C. for 24 hours. After cooling to room temperature, the solutions were then coated onto suitable substrates as described in subsequent examples.

TABLE 1

Formulation of Ceramifiable Adhesive Polymer solutions

| | I2 | M3 | M2 | M1 | I1 | Solvent | Solid Content |
|---|---|---|---|---|---|---|---|
| Example 1 | 0 | 0 | 15 g | 85 g | 0.1 g | Ethyl Acetate 200 g/Methanol 33 g | 30% |
| Example 2 | 0 | 10 g | 15 g | 75 g | 0.1 g | Ethyl Acetate 200 g/Methanol 33 g | 30% |
| Example 3 | 0.1 g | 10 g | 15 g | 75 g | 0.1 g | Ethyl Acetate 200 g/Methanol 33 g | 30% |
| Example 4 | 0.1 g | 0 | 15 g | 85 g | 0.1 g | Ethyl Acetate 200 g/Methanol 33 g | 30% |

Comparative Examples C1-C3

Comparative Adhesive polymer solutions were prepared using the formulations in Table 2. The solutions were prepared as described in Example 1, except that silane functional component-methyltriethoxysilane (MTES) was added after polymerization by direct mixing, if needed.

TABLE 2

Comparative Adhesive Solutions

| Example | ADH1 | M4 | Solution Solid Content |
|---|---|---|---|
| Comparative Example C1 | 90 | 0 | 30% |
| Comparative Example C2 | 85 | 15 | 30% |
| Comparative Example C3 | 60 | 40 | 30% |

Test Methods
Test Method 1: Transmission, Haze and Clarity

The transmission and haze of the ceramifiable adhesive polymers by themselves was measured. Glass slides, 50 mm×75 mm, were cleaned with IPA and dried with a lint free cloth. The glass slides were spin coated with the ceramifiable adhesive polymers Examples 1-4 and Comparative Example 1-3 at 1500 rpm for 30 sec and dried at 90 C on a hotplate for ten minutes. The slides were then baked in a furnace at a ramp rate of 10° C./min up to 300° C., then heated at 10° C./min up to 500° C. and held for 1 hour, and then allowed to cool to ambient temperature. The measurement of average % transmission was conducted with a haze meter (BYK Gardiner, under the trade designation "BYK Hazegard Plus, Columbia, Md.") based on ASTM D1003-11. The transmission and haze were recorded for the Examples and Comparative Examples and are shown below in Table 3.

Test Method 2: Peel Adhesion

To measure the adhesive performance, the adhesive compositions described above were coated using a notch bar set with a 51 micrometer (2 mil) gap onto primed PET Film and dried in a convection oven at 90° C. for ten minutes. Peel adhesion is the force required to remove an adhesive coated flexible sheet of material from a test panel (adherend) measured at a specific angle and rate of removal. IPA was used to clean the adherend (glass) prior to film application. The adhesive film samples were cut into 2.54 centimeter (1 inch) wide strips. After lamination and prior to testing, the samples were equilibrated at a room temperature, 23° C. and relative humidity of 50%, for 15 minutes. Peel adhesion was measured as a 180 degree peel back at a crosshead speed of 30 cm/min (12 in/min) using IMASS 2100 Slip/Peel Tester (IMASS, Inc., Accord, Mass.). The peel adhesion force was reported as an average of three replicates, in ounces per inch and converted to Newtons/decimeter (N/dm). The peel adhesion for the Examples and Comparative Examples are shown below in Table 3.

Test Method 3: Thermal Decomposition Temperature (TGA Data)

The adhesive polymer solutions were dried in a tared aluminum pan in a convection oven to achieve a dry weight of about 5 mg. The pans were placed inside a Q500 Thermogravimetric Analyzer from TA Instruments (New Castle, Del.). The heating rate selected was 10° C./min up to 550° C. The amount of inorganic residue was defined as the normalized weight percent of the material remaining after the bake cycle was complete. The inorganic residue results were recorded for the Examples and Comparative Examples and are shown below in Table 3.

TABLE 3

Table of results showing adhesive performance and optical performance of the ceramifiable adhesives after bake-out

| | Peel Force (oz/in) N/dm | Transmission After Bake (%) | Haze After Bake (%) | TGA Residue (%) |
|---|---|---|---|---|
| Example 1 | (18.12) 19.82 | 94.10 | 0.17 | 4.23 |
| Example 2 | (12.17) 13.31 | 94.07 | 0.14 | 4.28 |
| Example 3 | (12.09) 13.23 | 94.23 | 0.10 | 4.06 |
| Example 4 | (21.40) 23.41 | 94.10 | 0.15 | 3.97 |
| Comparative Example C1 | (54.85) 60.01 | 93.80 | 0.09 | 0.17 |
| Comparative Example C2 | (30.81) 33.71 | 93.80 | 0.11 | 0.31 |
| Comparative Example C3 | (44.91) 49.13 | 82.53 | 0.24 | 0.98 |

Open-Faced Nanostructure Bonding Using Ceramifiable Adhesive

A microstructured film template was created using standard cast and cure microreplication. The substrate was primed PET Film. The replicating resin was a 75/25 blend of R2 and R3 with a photoinitator package comprising 1% I3, 1.9% S1, and 0.5% I5. Replication of the resin was conducted at 20 ft/min (6.1 m/min) with the replication tool temperature at 137° F. (58° C.). Radiation from a Fusion "D" lamp operating at 600 W/in was transmitted through the film to cure the resin while in contact with the tool. The replication tool was patterned with a 600 nm pitch linear sawtooth groove structure. The cured resin was then separated from the tool and wound into a roll.

This replicated template film was primed in a plasma chamber using argon gas at a flow rate of 250 standard cc/min (sccm) at a pressure of 25 mTorr and RF power of 1000 Watts for 30 seconds. Subsequently, a release coated replicated surface was prepared by subjecting the sample to a tetramethylsilane (TMS) plasma at a TMS flow rate of 150 SCCM but no added oxygen, which corresponded to an atomic ratio of oxygen to silicon of about 0. The pressure in the plasma chamber was 25 mTorr, and the RF power of 1000 Watts was used for 10 seconds. This created a film template—Microstructured Release Coated Polymer Tool.

An "open-faced" nanostructured surface was made by applying a resin mixture to a PMMA coated PET film and then molding and UV curing the resin in contact with the Microstructured Release Coated Polymer Tool. The resin was made by mixing (99.4 wt %) R4 with 0.5% I3 and 0.1% I4 photoinitiators and rolled for 24 hours until all solids were fully dissolved. The PMMA coated film was prepared by coating and drying 8 micrometers of PMMA copolymer C1 using a roll-to-roll web coating and drying process. The resin was poured onto the PMMA coated film, at a web speed of 10 ft/min (3 meters/min), and the coated web was pressed against the Microstructured Release Coated Polymer Tool using a nip heated to 90° F. (43° C.) and a pressure of 30 psi (207 kiloPascals). The microstructured resin was then cured using two banks of FUSION high intensity UV D-bulb lamps (obtained from Fusion Systems, Rockville, Md.), one set at 600 Watt/2.5 cm (100% power setting), and the other set at 360 Watt/2.5 cm (60% power setting). The cured, microstructured resin adhered to the PMMA copolymer, separated from Microstructured Release Coated Polymer Tool and was wound into a roll. The resulting open-faced nanostructured film had prisms of 540 nm height with a periodicity of 600 nm.

A sample of the open-faced nanostructured film (2 in×3 in-50 mm×75 mm) was coated with R1 which was applied to the sample by spin coating. Prior to spin coating, R1 was diluted to 15 wt % by adding an 80/20 (w/w) of IPA/butanol solvent system and filtered through a 0.1 micrometer PTFE filter. A glass microscope slide was used to support the film during the spin coating process. The spin parameters were 500 rpm/10 sec (solution application), 2000 rpm/10 sec (spin down), and 500 rpm/10 sec (dry). The sample was removed from spin coater and placed on a hotplate at 80° C. for 4 hours to remove the solvent and cure R1 to a "green" (not fully cured) state. This created a film stack of unprimed PET/C1/Nanostructured resin R4/filled with "green" R1.

Adhesion Promotion Layer Coating

Glass slides, 50 mm×75 mm, were cleaned with IPA and a lint free cloth. The slide was mounted on the vacuum chuck of a Model WS-6505-6npp/lite spin coater. A vacuum of 64 kiloPascals (19 inches of Hg) was applied to hold the glass to the chuck. The spin coater was programmed for 500 rpm for 10 seconds (coating application step) then 1500 rpm for 10 sec (spin step), then 500 rpm for 10 seconds (dry step).

The ceramifiable adhesive compositions shown in all Examples were diluted to approximately 15% with IPA. Approximately 2-3 mL of the solution was applied to the glass slide during the coating application portion of the spin cycle at 1500 rpm for 30 sec. The slide was then removed from the spin coater and put on a hotplate at 100° C. for 30 minutes and covered with an aluminum tray. The slide was then allowed to cool to room temperature.

Lamination

The film stack of unprimed PET/C1/Nanostructured resin R4/filled with "green" R1 was laminated at 160° F. (71° C.), R1 coating side down, to the adhesive-coated glass slide using a thermal film laminator (GBC Catena 35, GBC Document Finishing, Lincolnshire, Ill.). The laminated sample was removed from the laminator and allowed cool to room temperature.

Bake-Out

After lamination, the unprimed PET supporting the film stack was separated from the PMMA copolymer (C1) leaving the PMMA copolymer and all other layers adhered to the glass slide. The sample was placed in a box furnace (Lindberg Blue M box furnace model BF51732PC-1, Asheville N.C., USA) and brought from 25° C. to 300° C. at a rate of approximately 10° C./min. The furnace was held at 300° C. for thirty minutes, then heated to 500° C. at a rate of approximately 10° C./min and held for one hour to complete the bake-out most of the organic components of the film stack. The furnace and sample were then allowed to cool down to ambient temperature.

Figure 9:
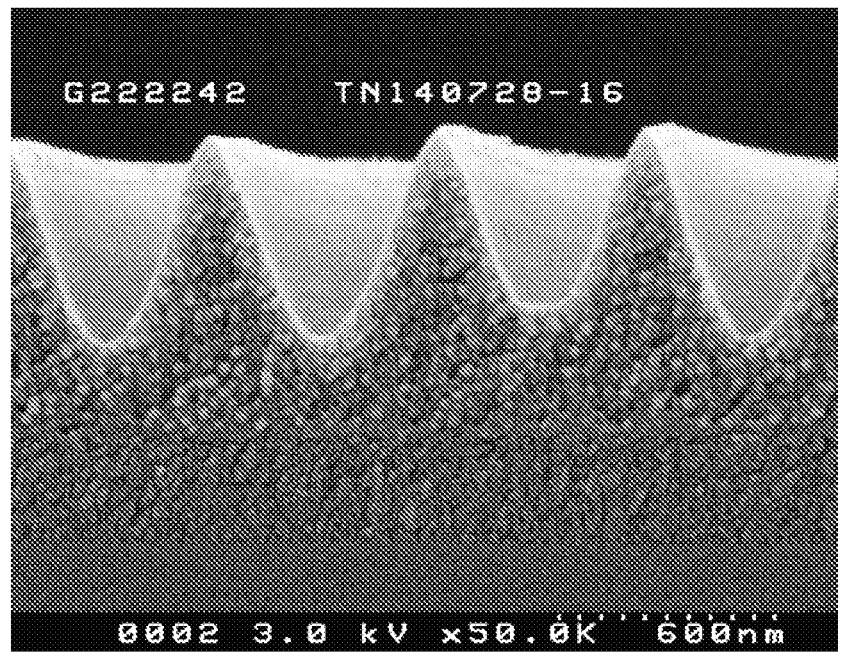
FIG. 9 is a Scanning Electron Micrograph (SEM) of a multilayer article of the present disclosure.
Figure 10:
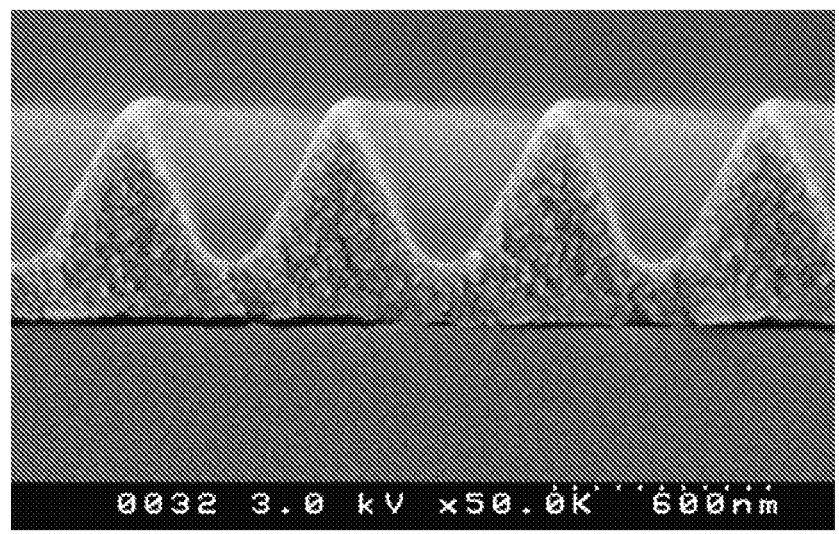
FIG. 10 is a Scanning Electron Micrograph (SEM) of a comparative multilayer article not of the present disclosure In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

For surface imaging, specimens were mounted on an aluminum stub. Cross sections were prepared by scoring with a scribe and fracturing at ambient temperature. These were mounted on an additional stub. All specimens were sputter coated with gold/palladium and were examined using the Hitachi S-4500 Field Emission Scanning Electron Microscope. The resulting inorganic nanostructure made from Examples 1-4 is shown in FIG. 9. FIG. 10 shows a sample made from Comparative Example 1.

Based on the SEM cross sections the adhesion after bake-out was rated according to the following scale: Good=microstructures adhere to the glass without any evidence of delamination and nanostructure is uniform across the substrate; Fair=microstructures weakly adhere to the glass with some evidence of delamination and areas where nanostructure is not observed; Poor=microstructures do not adhere to the glass due to delamination and can easily be removed with tape. The rating results are presented in Table 4.

TABLE 4

After bake-out adhesion results

| | Rating |
|---|---|
| Example 1 | Good |
| Example 2 | Good |
| Example 3 | Good |
| Example 4 | Good |
| Comparative Example 1 | Poor |
| Comparative Example 2 | Poor |
| Comparative Example 3 | Fair |

What is claimed is:

1. An adhesive layer comprising:
    a cured copolymer prepared from a reaction mixture comprising:
        at least one alkyl (meth)acrylate;
        at least one ethylenically unsaturated silane;
        at least one inorganic nanomaterial; and
        an initiator;
    wherein the adhesive layer is a pressure sensitive adhesive at room temperature, is optically clear having a visible light transmission of at least 95% and a haze of no more than 2%, and is convertible into a ceramic-like layer by bake-out at a temperature of from 170-500° C.

2. The adhesive layer of claim 1, wherein the at least one alkyl (meth)acrylate comprises an alkyl group with 4-20 carbon atoms.

3. The adhesive layer of claim 1, wherein the reaction mixture further comprises:

at least one copolymerizable ethylenically unsaturated compound that is free of acidic or basic groups.

4. The adhesive layer of claim 3, wherein the at least one copolymerizable ethylenically unsaturated compound that is free of acidic or basic groups comprises a hydroxyl functional (meth)acrylate.

5. The adhesive layer of claim 1, wherein the at least one ethylenically unsaturated silane is of by the general formula:

$$X\text{-}L_1\text{-}SiY^1Y^2Y^3$$

wherein

X comprises a (meth)acrylate group;

$L_1$ is a single covalent bond or a divalent linking group; and each of $Y^1$, $Y^2$, and $Y^3$ is independently a hydrolysable group or an alkyl group, such that at least one of $Y^1$, $Y^2$, and $Y^3$ is a hydrolysable group.

6. The adhesive layer of claim 1, further comprising at least one additive selected from plasticizers, tackifiers, microparticle fillers, metal oxide fillers, bead fillers, glass bubbles, chopped fibers, antioxidants, viscosity control additives, refractive index modifying agents, or combinations thereof.

7. The adhesive layer of claim 6, wherein the at least one additive comprises a siloxane tackifier resin.

8. The adhesive layer of claim 1, wherein the initiator comprises a thermal initiator.

9. The adhesive layer of claim 1, wherein the adhesive layer comprises a structured surface.

10. A transfer tape comprising:
a release substrate with a first major surface and a second major surface; and
an adhesive layer adjacent to at least a portion of the second major surface of the release substrate, the adhesive layer comprising:
a cured copolymer prepared from a reaction mixture comprising:
at least one alkyl (meth)acrylate;
at least one copolymerizable ethylenically unsaturated compound that is free of acidic or basic groups;
at least one ethylenically unsaturated silane; at least one inorganic nanomaterial; and
an initiator;
wherein the adhesive layer is a pressure sensitive adhesive at room temperature, is optically clear having a visible light transmission of at least 95% and a haze of less than 2%, and is convertible into a ceramic-like layer by bake-out at a temperature of from 170-500° C.

11. The transfer tape of claim 10, wherein the adhesive layer is in contact with the second major surface of the release substrate.

12. The transfer tape of claim 10, wherein the adhesive layer comprises a structured surface.

13. The transfer tape of claim 10, further comprising a backfill layer wherein the backfill layer is intermediate between the adhesive layer and the second major surface of the release substrate.

14. The transfer tape of claim 10, further comprising a backfill layer and a sacrificial layer, wherein the backfill layer is in contact with the adhesive layer, and the sacrificial layer is in contact with the backfill layer, and wherein the sacrificial layer comprises a release layer or a template layer and wherein the sacrificial layer is removed prior to or during bake-out.

15. A multilayer article comprising:
a receptor substrate comprising a first major surface and a second major surface; and
a ceramic-like layer in contact with the second major surface of the receptor substrate, the ceramic-like layer comprising a baked-out pressure sensitive adhesive layer, wherein the pressure sensitive adhesive, is optically clear having a visible light transmission of at least 95% and a haze of less than 2%, and is baked-out at a temperature of from 170-500° C., the pressure sensitive adhesive layer comprising:
a cured copolymer prepared from a reaction mixture comprising:
at least one alkyl (meth)acrylate;
at least one copolymerizable ethylenically unsaturated compound that is free of acidic or basic groups;
at least one ethylenically unsaturated silane; at least one inorganic nanomaterial; and
an initiator.

16. The multilayer article of claim 15, further comprising a cured backfill layer in contact with the ceramic-like layer, the cured layer comprising a curable backfill layer cured during bake-out.

17. The multilayer article of claim 15, wherein the receptor substrate comprises glass, metal, sapphire, silicon, silica, silicon carbide, silicon nitride, and semiconductor materials on a support wafer.

18. The multilayer article of claim 15, further comprising a second receptor substrate with a first major surface and a second major surface, wherein the ceramic-like layer is in contact with the first major surface of the second receptor substrate.

19. A method of preparing an article comprising:
providing a receptor substrate with a first major surface and a second major surface;
providing a transfer tape, the transfer tape comprising:
a release substrate with a first major surface and a second major surface; and
a pressure sensitive adhesive layer adjacent to at least a portion of the second major surface of the release substrate, the pressure sensitive adhesive layer is optically clear having a visible light transmission of at least 95% and a haze of less than 2%, and comprising: a cured copolymer prepared from a reaction mixture comprising:
at least one alkyl (meth)acrylate;
at least one copolymerizable ethylenically unsaturated compound that is free of acidic or basic groups;
at least one ethylenically unsaturated silane; at least one inorganic nanomaterial; and
an initiator;
applying the transfer tape to the receptor substrate such that the pressure sensitive adhesive layer is in contact with the second major surface of the receptor substrate;
removing the releasing substrate from the transfer tape in contact with the second major surface of the receptor substrate to form a pressure sensitive adhesive layer laminated to the second major surface of the receptor substrate; and
baking-out the pressure sensitive adhesive layer laminated to the second major surface of the receptor substrate at a temperature from 170-500° C., to form a ceramic-like layer on the second major surface of the receptor substrate.

20. The method of claim 19, further comprising applying a backfill layer to the surface of the pressure sensitive adhesive layer laminated to the second major surface of the receptor substrate prior to baking-out the pressure sensitive adhesive layer laminated to the second major surface of the receptor substrate, such that the backfill layer cures during the bake-out and adheres to the receptor substrate via the ceramic-like layer formed from the adhesive layer.

21. The method of claim 19, wherein providing a transfer tape comprises providing a transfer tape comprising:
- a releasing substrate;
- a backfill layer in contact with the releasing substrate; and
- a pressure sensitive adhesive layer in contact with the backfill layer.

22. The method of claim 19, further comprising:
- providing a second receptor substrate with a first major surface and a second major surface; and
- contacting the first major surface of the second receptor substrate to the pressure sensitive adhesive layer.

23. The method of claim 19, further comprising:
- prior to baking-out, providing a second receptor substrate with a first major surface and a second major surface, and a second adhesive layer in contact with the first major surface of the second receptor substrate, wherein the second adhesive layer can be the same or different from the first adhesive layer, and bakes out at the same or a lower temperature than the first adhesive layer;
- contacting the second adhesive layer to the surface of the first adhesive layer.

24. The method of claim 23, further comprising a backfill layer located between the first adhesive layer and the second adhesive layer.

* * * * *